(12) United States Patent
Johnson et al.

(10) Patent No.: US 8,825,798 B1
(45) Date of Patent: Sep. 2, 2014

(54) BUSINESS EVENT TRACKING SYSTEM

(75) Inventors: Terry Alan Johnson, Sugarloaf Key, FL (US); Kwok-Keung Fung, Sacramento, CA (US); Robert J. Ortega, Moravian Falls, NC (US)

(73) Assignee: Wells Fargo Bank N.A., San Francisco, CA (US)

( * ) Notice: Subject to any disclaimer, the term of this patent is extended or adjusted under 35 U.S.C. 154(b) by 121 days.

(21) Appl. No.: 13/364,699

(22) Filed: Feb. 2, 2012

(51) Int. Cl.
| | |
|---|---|
| *G06F 15/16* | (2006.01) |
| *G06Q 20/38* | (2012.01) |
| *H04L 29/08* | (2006.01) |
| *G06F 9/54* | (2006.01) |

(52) U.S. Cl.
CPC .......... *G06Q 20/385* (2013.01); *G06F 2201/86* (2013.01); *H04L 67/22* (2013.01); *G06F 9/542* (2013.01)
USPC ......................................................... 709/217

(58) Field of Classification Search
CPC ... G06Q 20/385; G06F 2201/86; G06F 9/542; H04L 67/22
USPC ...................................... 709/217; 705/1–912
See application file for complete search history.

(56) References Cited

U.S. PATENT DOCUMENTS

| | | | |
|---|---|---|---|
| 5,832,464 A | 11/1998 | Houvener et al. | |
| 7,523,068 B2 | 4/2009 | Britney et al. | |
| 7,540,408 B2 | 6/2009 | Levine et al. | |
| 7,792,688 B2 | 9/2010 | Yanak et al. | |
| 2003/0158811 A1 | 8/2003 | Sanders et al. | |
| 2004/0193552 A1* | 9/2004 | Ikenaga et al. ................... | 705/75 |
| 2004/0215560 A1 | 10/2004 | Amalraj et al. | |
| 2005/0114262 A1 | 5/2005 | Howard et al. | |
| 2007/0162500 A1* | 7/2007 | Herwadkar ................. | 707/104.1 |
| 2008/0064363 A1* | 3/2008 | Salafia et al. ............... | 455/404.1 |
| 2008/0065495 A1 | 3/2008 | Nguyen | |
| 2009/0119416 A1* | 5/2009 | Sirdevan et al. ............... | 709/246 |
| 2009/0132418 A1 | 5/2009 | Morsillo et al. | |
| 2009/0240627 A1 | 9/2009 | Rodriguez et al. | |
| 2010/0030688 A1 | 2/2010 | Patterson | |
| 2010/0106776 A1* | 4/2010 | Iwakura et al. ................ | 709/203 |
| 2010/0115040 A1* | 5/2010 | Sargent et al. ................. | 709/206 |
| 2010/0205091 A1 | 8/2010 | Graziano et al. | |

(Continued)

FOREIGN PATENT DOCUMENTS

EP            1744518 A2    1/2007

OTHER PUBLICATIONS

IBM® WebSphere® Commerce Feature Pack 2, "Paymentech Plug-in for WebSphere Commerce," ™ 2007, 34 pages.

(Continued)

*Primary Examiner* — Brian J Gillis
*Assistant Examiner* — Shean Tokuta
(74) *Attorney, Agent, or Firm* — Merchant & Gould P.C.

(57) ABSTRACT

A networked system includes a processing system and a tracking system. The processing system includes applications for processing business events and between which the business events may be transferred. The tracking system monitors a status of each business event as the business event flows through the processing system. Each application of the processing system generates an event message at a predetermined stage and sends the event message to the tracking system. The event message includes correlation information generated by the application based on predetermined rules. The tracking system matches the event message to a previous event message based on the correlation information and assigns a tracking identifier of the previous event message to the current event message.

15 Claims, 20 Drawing Sheets

(56) References Cited

U.S. PATENT DOCUMENTS

| | | |
|---|---|---|
| 2010/0327054 A1 | 12/2010 | Hammad |
| 2011/0087560 A1 | 4/2011 | West |
| 2011/0119132 A1 | 5/2011 | Morton et al. |
| 2011/0188397 A1* | 8/2011 | McCann et al. .............. 370/252 |

OTHER PUBLICATIONS

IBM® WebSphere® Commerce V6, "Payment administration," copyright 2007, 19 pages.

Sage Software, Inc. "Sage Payment Solutions—Integrated Payment Processing with Millennium," copyright 2009, 2 pages.

* cited by examiner

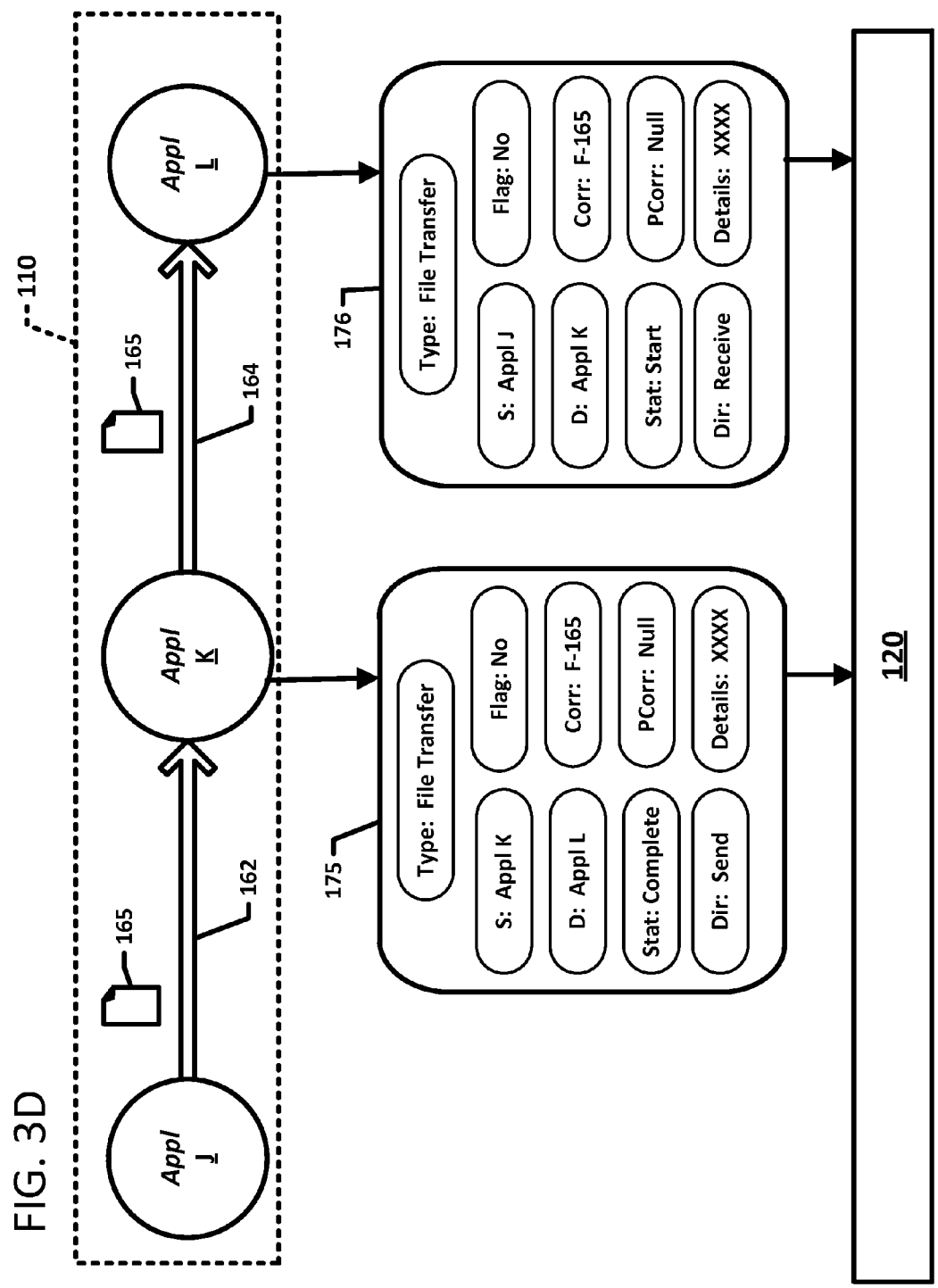

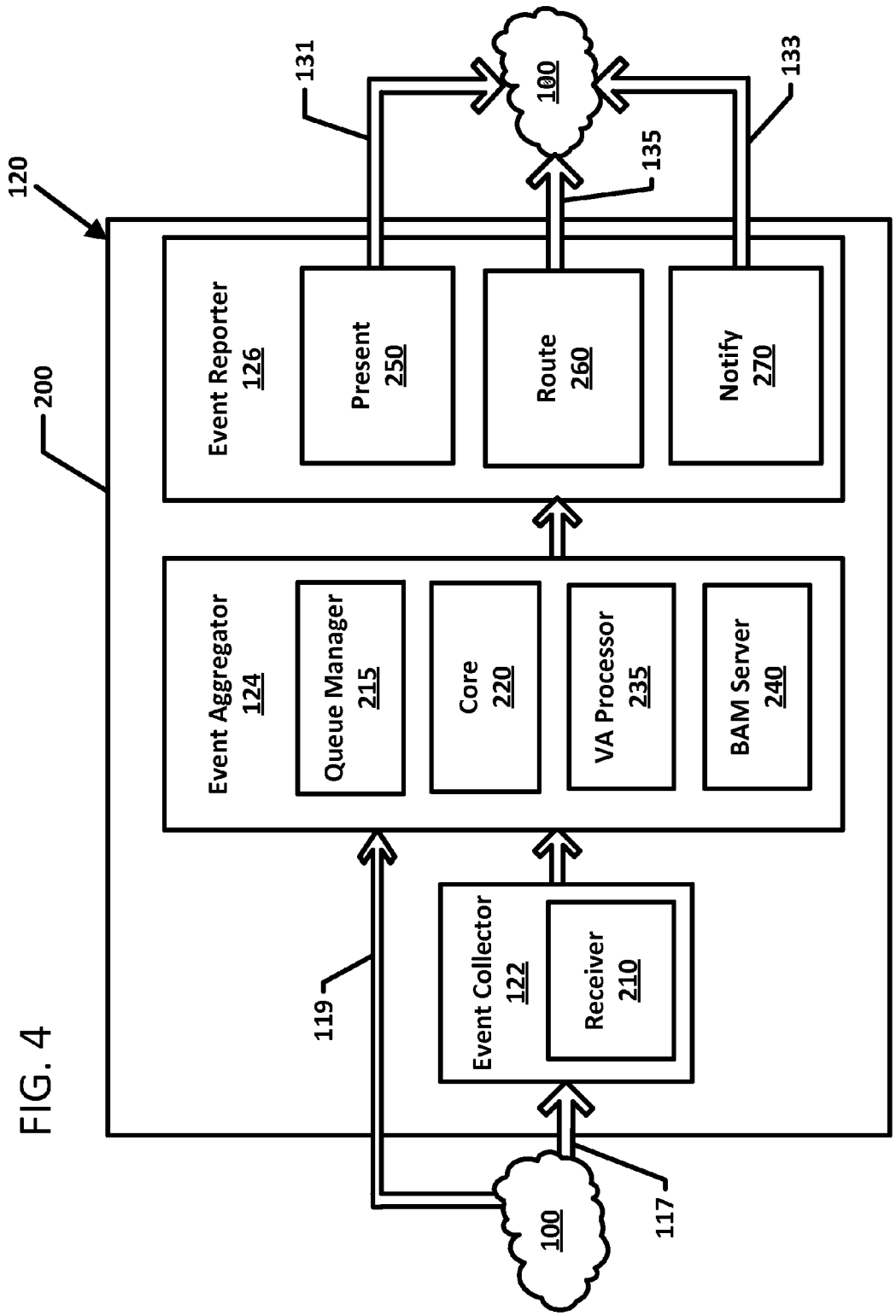

BUSINESS EVENT TRACKING SYSTEM

BACKGROUND

Banks and other financial merchant establishments utilize processing systems including myriad applications between which information (e.g., customer profiles, payment information, etc.) must be transferred. Some establishments attempt to manually monitor the transfer of information throughout the system to ensure timely file delivery, to analyze errors, and/or to identify potential fraudulent behavior. Such manual attempts at monitoring may be cumbersome, inefficient, and/or time consuming. Other establishments have integrated file tracking into the processing system applications by having the applications communicate with each other to confirm receipt of files, etc. Such automated attempts may drain system resources or otherwise limit the efficiency of the processing system.

Other types of tracking systems and methods are desirable.

SUMMARY

The disclosure is directed to tracking business event (e.g., payment flow, file transfer, session flow, or other transactions) across one or more applications within a processing system. As the business event flows within the processing system (e.g., from application to application), a tracking system monitors the workflow of the business event through the processing system and correlates related events using a tracking ID.

In accordance with some aspects of the disclosure, the tracking system also enables a user to monitor the progress of the business event and to view a current status of the business event along the workflow. Certain types of tracking systems also provide analytical tools, alerting tools, and business activity monitoring tools.

In some implementations, the processing system includes a cross-platform environment ranging from mainframes to personal computers. In certain implementations, the processing system includes multiple remote computer systems.

In some implementations, the tracking system correlates event messages without requiring the applications of the processing system to track unique identifiers for related business event flows. In certain implementations, the tracking system identifies related business event using correlation information provided by upstream/downstream pairs of applications.

In some implementations, the tracking system correlates event messages without requiring interfering event capture APIs. In certain implementations, the tracking system uses an asynchronous messaging service to process events in a timely manner.

BRIEF DESCRIPTION OF THE DRAWINGS

FIGS. 3A-3D provide an example walk-through of the messages sent to the DMP during an example file transfer type transaction;

FIG. 4 is a schematic block diagram of the tracking system 120 of FIG. 1 implemented as the DMP;

DETAILED DESCRIPTION

The disclosure is directed to tracking business event (e.g., payment flows, file transfers, session flows, or other transactions) across one or more applications within a processing and tracking network system 100. The processing and tracking network system 100 includes a processing system 110 and a tracking system 120. One or more business events flow through the processing system 110 (e.g., between one or more of the various applications). Non-limiting examples of business event include a payment to a credit card, a charge to a debit card, a balance transfer, a loan request, a loan payoff, etc. Each business event may include a group of transactions. For example, a payroll event may include payment transactions for each employee on the payroll.

Figure 1:
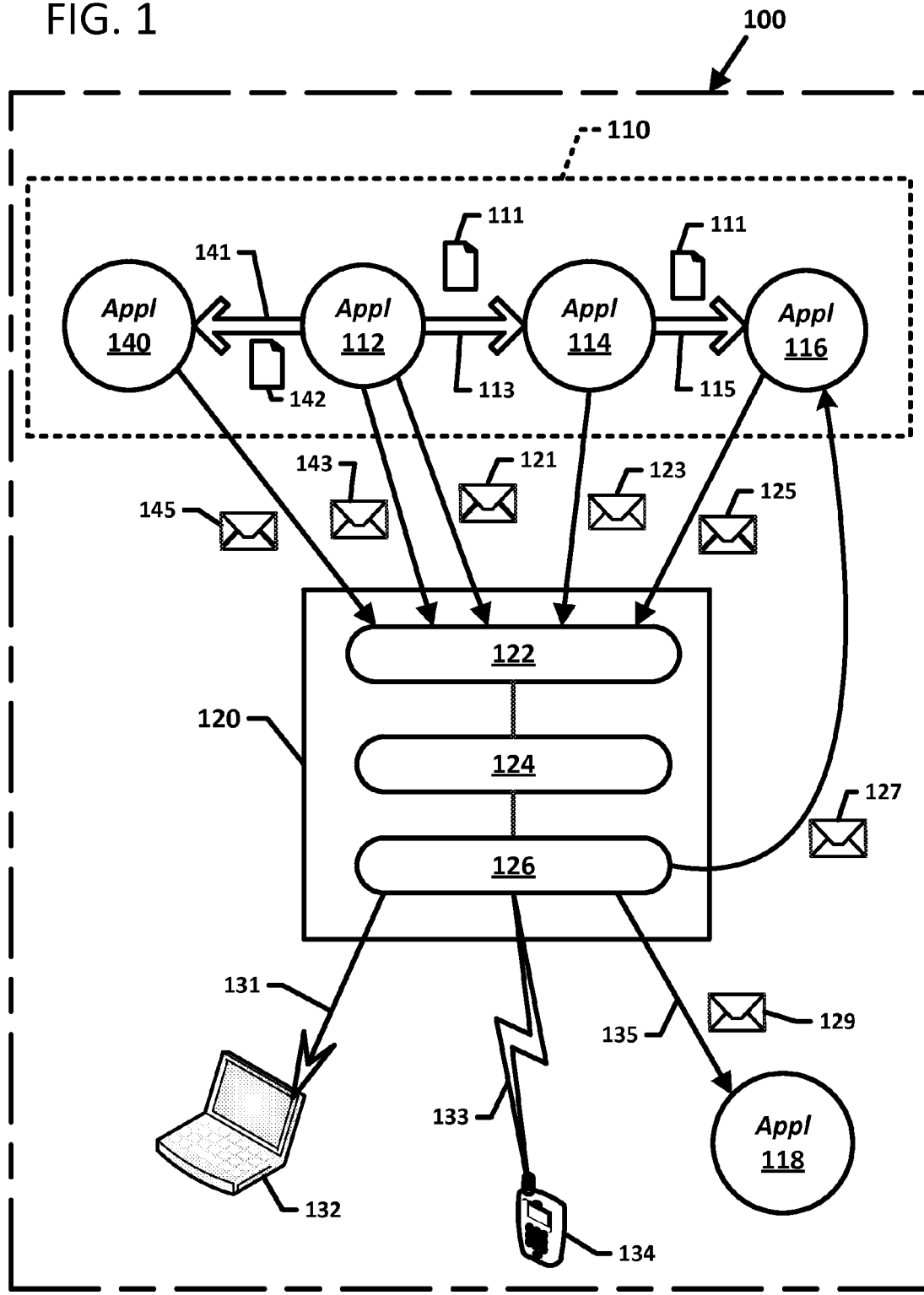
FIG. 1 is a schematic diagram of an example network including a processing system and a tracking system in accordance with the principles of the present disclosure.

As shown in FIG. 1, an example processing system 110 may include a first application 112, a second application 114, a third application 116, and a fourth application 140. In other implementations, however, the processing system 100 may include any desired number of applications. In the example shown, a business event 111 is being transferred for processing from application 112 to application 114 (see arrow 113) and from application 114 to application 116 (see arrow 115). In addition, a second business event 142 is being transferred for processing from application 112 to application 140 (see arrow 141).

A tracking system 120 monitors the progress of the first business event 111 and the second business event 142 through the processing system 110. For example, the tracking system 120 includes a collector module 122 that receives messages (e.g., XML messages) from each application 112, 114, 116, 140 over the network 100. The tracking system 120 also includes an aggregation module 124 that correlates the messages stemming from the same business event. In certain implementations, the aggregation module 124 creates and stores a record of the messages received for each business event. In certain implementations, the aggregation module 124 creates and stores the relationships between the various collected messages.

As will be disclosed in more detail herein, the tracking system 120 generates a unique tracking identifier for each business event that flows through the processing system 110. As the tracking system 120 receives messages from the applications, the tracking system 120 determines whether or not each message indicates a new business event has been initiated, identifies any existing business event to which each message pertains, and associates each message with the appropriate tracking identifier. The tracking identifier is used internally within the tracking system 120. The tracking system 120 does not need to communicate the tracking identifier to the applications in the processing system 110 or to receive the tracking identifier from any of the applications in the processing system 110.

For example, as shown in FIG. 1, the collector module 122 receives at least one event message 121 from application 112, at least one event message 123 from application 114, and at least one event message 125 from application 116 pertaining to the transfer of business event 111. In some implementations, each application 112, 114, 116 send an event message 121, 123, 125 for each process performed on the business event 111 by the application. For example, the applications 112, 114, 116 may send an event message when the business event 111 is received at the application, when an internal process is performed on the business event 111, and/or when the business event 111 is sent to the next application. In certain implementations, one or more of the applications 112, 114, 116 may send an event message 121, 123, 125 at the initiation of a process performed by the application and at the conclusion of the process.

The collector module 122 also receives at least one event message 143 from application 112 and at least one event message 145 from application 140 pertaining to the transfer of the second business event 142. In other implementations, the collector module 122 may receive additional event messages from any of the applications (e.g., pertaining to internal processes of the application). The aggregator module 124 determines that the event messages 121, 123, 125 relate to the transfer of business event 111. The aggregator module 124 also determines that both of the event messages 143, 145 relate to the transfer of the second business event 142.

The tracking system 120 also includes a reporter module 126 that is configured to implement various actions based on the event messages received and processed at the tracking system 120. For example, in some implementations, the reporter module 126 may be configured to display a visual status or progress of one or more business events to a user (e.g., a customer service representative, a bank customer, a fraud detection specialist, etc.). In some implementations, the reporter module 126 generates a website or other graphical presentation and displays (e.g., via a browser) the website on a display screen (e.g., computer monitor, smartphone screen, tablet screen, projection screen, television, etc.) 132. For example, in FIG. 1, the reporter module 126 sends a website 131 to a first display device 132. In the example shown, the website 131 is sent to a laptop display screen 132. In certain implementations, the reporter module 126 provides an interactive display (e.g., a graphical user interface) with which a user may organize and/or modify the status information as will be discussed in more detail herein.

In other implementations, the reporter module 126 is configured to send a message to a user (e.g., to a personal computer, tablet computer, client computer, telephone, cellular phone, smartphone, pager, email account, voicemail account, etc.). In various implementations, the message may include an alert (e.g., that an error occurred), a confirmation (e.g., that an application process completed), a status report (e.g., an indication of where the business event is in the workflow), or a progress report (e.g., an indication of where the business event has been in the workflow). For example, in FIG. 1, the reporter module 126 sends an alert 132 to a second display device 134 (see 133). In the example shown, the alert 133 is sent to a smartphone 134. In other implementations, however, the first and second display devices 132, 134 may include computer monitors, tablet screens, cellular phones, smartphones, projection screens, televisions, or other graphic display devices.

In still other implementations, the reporter module 126 is configured to send a message (e.g., an XML message) to an application for consumption (e.g., automatically or manually). In some implementations, the reporter module 126 forwards one or more of the messages received by the collector module 122. In other implementations, the reporter module 126 generates a new message to be sent to an application. For example, in FIG. 1, the reporter module 126 sends a first message 127 to application 116 of the processing system 110 and a second message 129 to a fifth application 118. In certain implementations, the fifth application 118 may form part of the processing system 110. In the example shown, the fifth application 118 is separate from the processing system 110.

In certain implementations, the fifth application 118 may be a quality control application. In some such implementations, the quality control application 118 is configured to monitor the status of business events being processed. For example, the quality control application 118 may determine that an application is taking too much time to process a business event and send an alert to a quality controller to investigate. In other implementations, the quality control application 1118 is configured to monitor the status of one or more applications that process business events. For example, the quality control application 118 may determine that a processing application has too large of an incoming queue and may redirect or redistribute incoming event messages to available applications within the system. In still other implementations, the fifth application 118 may be a fraud detection program that tracks customer usage and determines whether a current business event is outside the normal usage profile of an associated customer.

Figure 2:
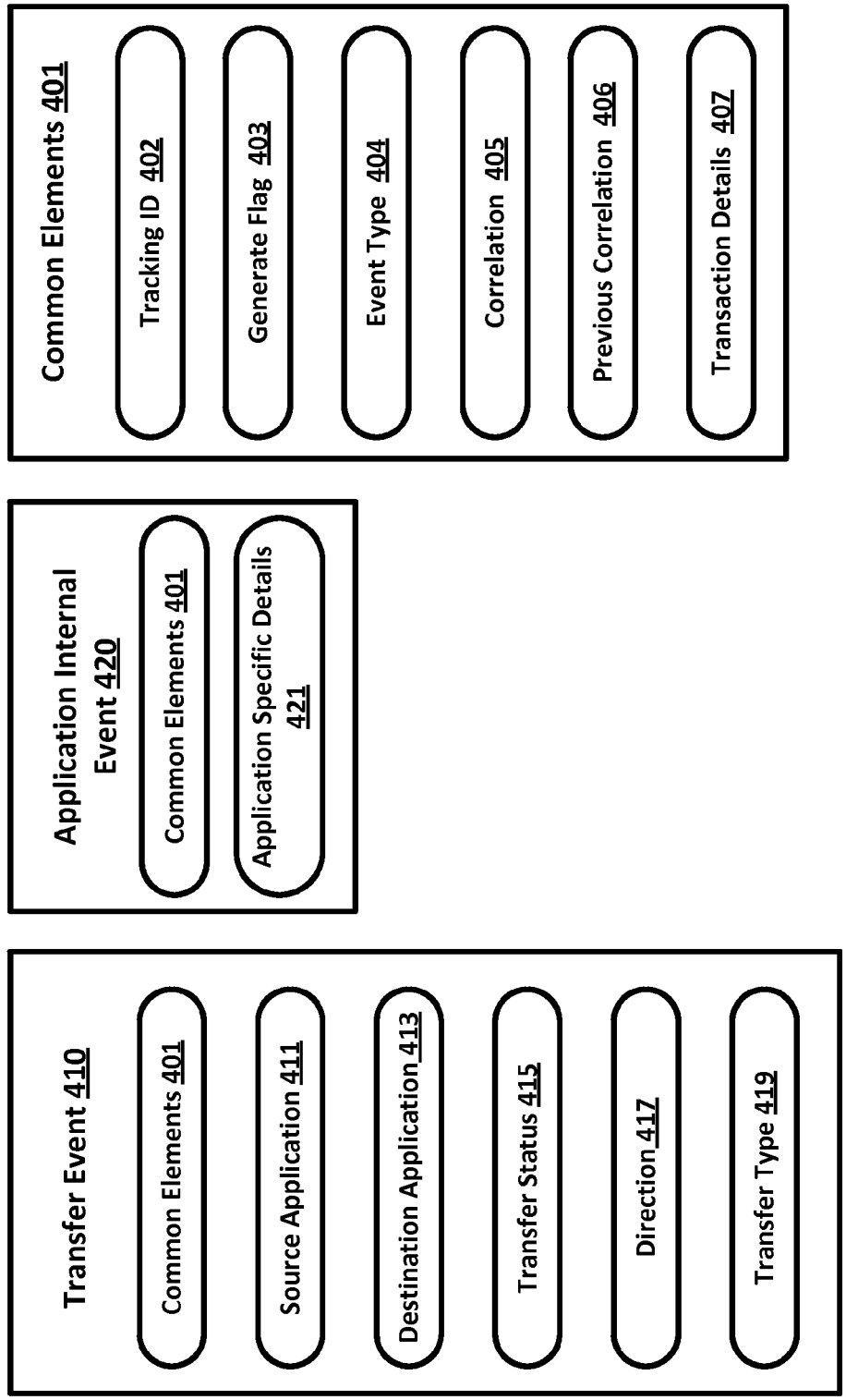
FIG. 2 shows example message schemas that are suitable for use in providing information to a data management platform (DMP) in accordance with the principles of the present disclosure.

FIG. 2 shows example message schemas that are suitable for use in providing information to the DMP 200. In particular, FIG. 2 shows an example implementation of a first type of message 410 that pertains to an event transfer (e.g., a file transfer, a message transfer, and a database call) and a second type of message 420 that pertains to an application internal event (i.e., an application-specific message). Each application in the processing system 110 is configured to send one or both types of messages to the tracking system 120. In other implementations, one or more applications may send additional types of messages.

In the example shown in FIG. 2, both types of messages 410, 420 include common elements 401. In some implementations, the common elements 401 for both types of messages 410, 420 include a generate flag variable 403, an event type variable 404, a correlation information variable 405, a previous correlation information variable 406, and a transaction details variable 407. The event type variable 404 indicates whether the message 400 is provided in response to a transfer (i.e., first type 410) or in response to an application-specific internal event (i.e., second type 420). The transaction details pertain to the specific business event being tracked (e.g., account number, payment details, routing details, bank details, etc.).

The generate flag 403 indicates whether the application sending the message is initiating a new business event, in which case a new tracking ID should be generated for the new business event, or furthering an existing business event, in which case a previously generated tracking ID should be determined and associated with the message. For example, in some implementations, each application that communicates with the DMP 200 is aware of where the application fits into the processing flow of processing system 110. For example, application 112 of FIG. 1 is aware that it is initiating the transfer of file 111. Accordingly, the message 121 from application 112 includes a true value in the generate flag variable 403. In contrast, application 114 of FIG. 1 is aware that it did not initiate the transfer of file 111. Accordingly, the message 123 from application 114 includes a false value in the generate flag variable 403.

The correlation information 405 and previous correlation information 406 enable the DMP 200 to identify and associate messages pertaining to a common business event. Each application that communicates with the DMP 200 is paired with one or more applications within the processing system 110 with which the application will communicate during the processing flow of various business events. For example, application 112 of FIG. 1 forms a first pair with application 114 and forms a second pair with application 140. Each application pair is associated with rules for generating correlation information.

In general, the generation rules are selected to enable each application of the pair to independently generate a common correlation value. In some implementations, the generation rules includes rules for generating a value based on the file name, timestamp, checksum, and/or content of a file being transferred. For example, in one implementation, the generation rule for an example application pair includes taking the MD5 (Message-Digest Algorithm) of the content of the object being transferred. In other implementations, other types of cryptographic hash function or other types of algorithms may be applied to the object or metadata pertaining to the object.

The correlation variable 405 contains the correlation value generated by application using the appropriate generation rules. In some implementations, all of the applications within the processing system 110 use the same rules for generating correlation information. In such implementations, only the correlation variable 405 is used. In other implementations, one or more applications pairs may have different rules for generating correlation information. In such implementations, the application at which the rules switch is responsible for sending the correlation value generated using the new rules under the correlation variable 405 and for sending the correlation value generated using the previous rules under the previous correlation variable 406.

In some implementations, one or more applications may have internal correlation value generation rules. For example, in certain implementations, an application may send to the tracking system 120 a message pertaining to an internal event that does not involve another application. In some such implementations, the application may provide a correlation value based on the correlation rules utilized with the application from which the application received the object. In other such implementations, the application may provide a new correlation value generated based on its internal rules and an old correlation value based on the previous rules.

For example, in FIG. 1, application 112 and application 114 have a common set of rules by which both applications 112, 114 generate correlation information pertaining to the file 111. Accordingly, application 112 and application 114 can send the same correlation value to the tracking system 120 (e.g., DMP 200) for a business event therebetween without exchanging (i.e., sending or receiving) the correlation information between each other. In certain implementations, application 114 may share a different set of generation rules with application 116. Accordingly, application 114 generates and sends the same correlation value as application 116 for each business events being reported. However, application 114 also generates and sends a correlation value based on the rules shared by application 114 and application 112.

In certain implementations, the common elements 401 for both types of messages 410, 420 also include a tracking identification (ID) variable 402. In some implementations, the tracking ID variable 402 is not used by the applications 112, 114, 116 of the processing system 110. For example, the messages 111, 113, 115 generated by the applications 112, 114, 116 may have a null value for the tracking ID variable 402. Rather, the tracking system 120 may utilize the same schema as the messages 121, 123, 125 and may generate the tracking ID variable 402 internally.

The transfer message 410 also includes additional data including a source application identifier 411, a destination application identifier 413, a transfer status 415, a direction 417, and a transfer type 419. The source application identifier 411 includes a string or other variable type that identifies the application sending the object being transferred. The destination application identifier 413 includes a string or other variable type that identifies the application receiving the object being transferred. In some implementations, the transfer status 415 includes a string or other variable type that indicates whether the transfer of the business event is being initiated or completed. In other implementations, the transfer status 415 element may indicate one or more intermediate statuses associated with the transfer.

The direction element 417 includes a string or other variable type that indicates whether the application that sent the message is sending the object to be transferred, receiving the object being transferred, or pulled the object being transferred. The transfer type element 419 indicates whether the object being transferred is a file, a message, or a database call. The transfer message 410 may contain additional information depending on the value of the transfer type element 419. For example, a file transfer type message may include additional information pertaining to the file being transferred (e.g., a creation date stamp, a priority, a checksum, etc.). A message transfer type may include additional information pertaining to the message being transferred (e.g., a message ID, a queue name, etc.). A database call transfer type may include additional information pertaining to the database call being transferred (e.g., a database record ID, a database name, etc.).

Figure 3A:
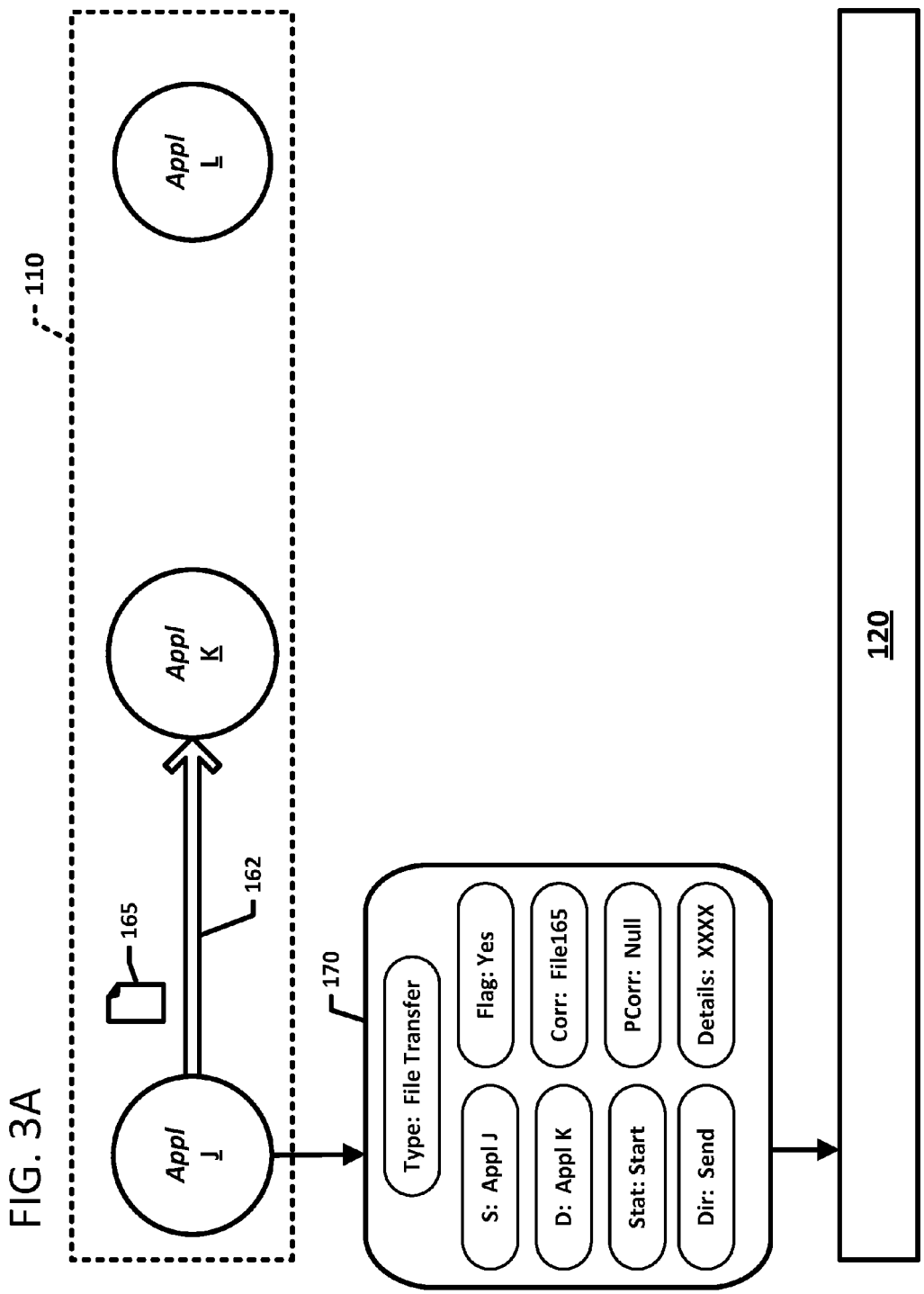

FIGS. 3A-3D provide an example walk-through of the messages sent to the DMP during an example file transfer type transaction. During the transaction, application J sends an object 165 (e.g., a file, a message, a database call) to application K, which sends the object 165 to application L. In FIG. 3A, the application J has initialized sending the object 165 to application K and has sent a message 170 to the tracking system 120. In the message 170, the source variable 411 is indicated to be application J, the destination variable 413 is indicated to be application K, the transfer status 415 is indicated as "start," the direction 417 is indicated as "send," and the transfer type 419 is indicated as a "file transfer."

The generate flag variable 403 is indicated as "Yes," thereby indicating that message 170 is the first message pertaining to this transaction. The correlation variable 405 contains the value "File165," which was generated based on rules associated with the pairing of application J and application K. The previous correlation variable 406 contains the value "null" since no other rules have been used to generate a correlation value for this transaction (e.g., since application J initiated the transaction). The transaction details variable 407 may contain any desired content, which is represented in FIG. 3A by "XXXX."

Figure 3B:
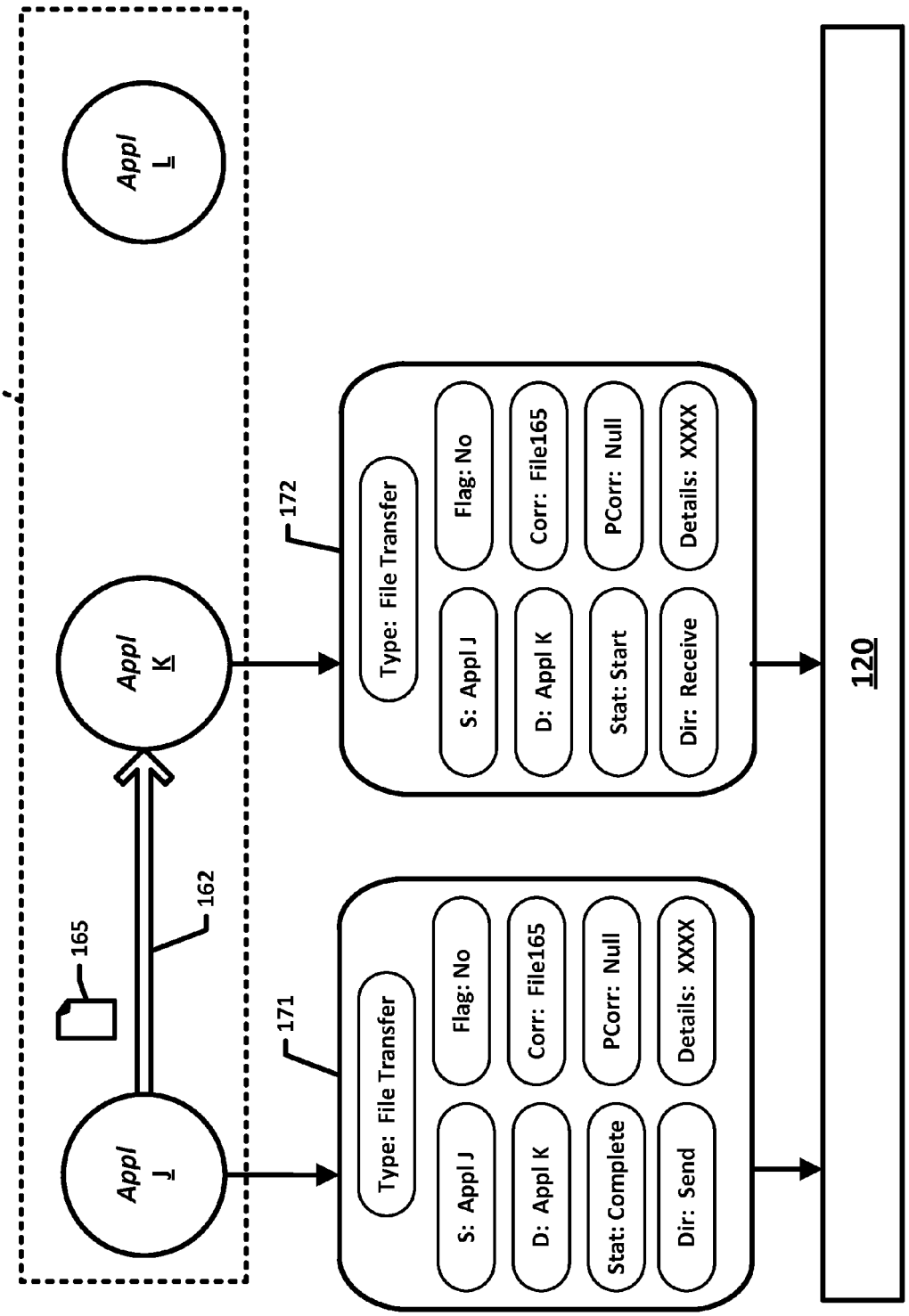

In FIG. 3B, the application J has completed sending the object 165 to application K and has sent a message 171 confirming the same to the tracking system 120. In the message 171, the values of the source variable 411, the destination variable 413, the direction 417, the transfer type 419, the correlation variable 405, the previous correlation variable 406, and the transaction details 407 remain the same as in message 170. In message 171, however, the transfer status variable 415 is identified as "complete" and the generate flag variable 403 is indicated as "No," thereby indicating that message 171 is not the first message pertaining to this transaction.

The application K has begun receiving the object 165 in FIG. 3B and has sent a message 172 to the tracking system 120. In the message 170, the source variable 411 is still indicated to be application J, the destination variable 413 is still indicated to be application K, the transfer status 415 is indicated as "start," the direction 417 is indicated as "receive," and the transfer type 419 is indicated as a "file transfer." The generate flag variable 403 is indicated as "No," thereby indicating that message 172 is not the first message pertaining to this transaction. The correlation variable 405 contains the value "File165," which was generated based on rules associated with the pairing of application J and application K. The previous correlation variable 406 contains the value "null" since no other rules have been used to generate a correlation value for this transaction. The transaction details variable 407 may contain any desired content, which is represented in FIG. 3B by "XXXX."

Figure 3C:
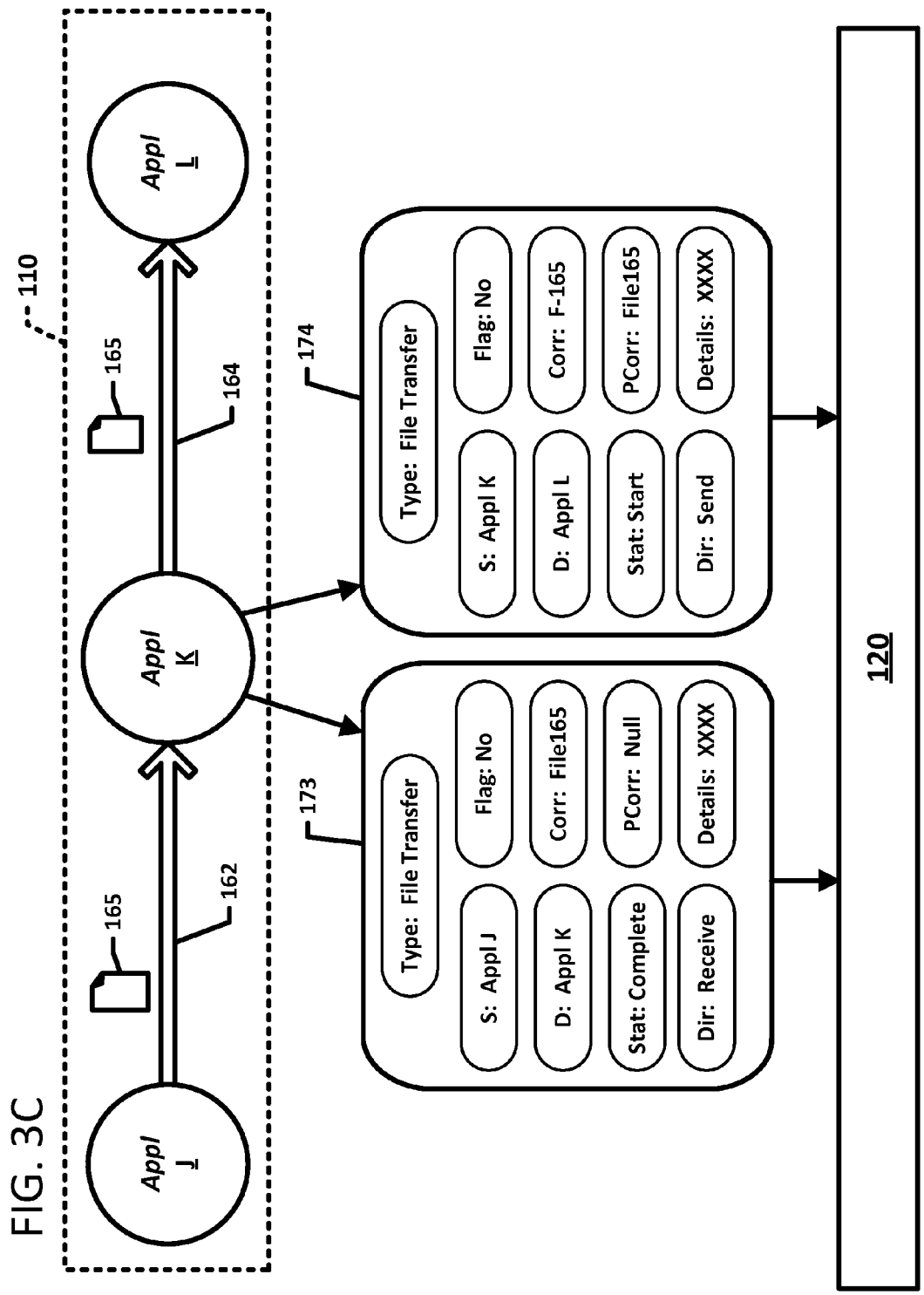

In FIG. 3C, the application K has completed receiving the object 165 and has begun sending the object 165 to application L. Accordingly, application K has sent a message 173 to the tracking system 120 to confirm that the object 165 was received. Application K also has sent a message 174 to the tracking system 120 to confirm/announce that the object 165 is being sent to application L. The message 173, the values of the source variable 411, the destination variable 413, the direction 417, the transfer type 419, the correlation variable 405, the previous correlation variable 406, and the transaction details 407 remain the same as in message 172. In message 173, however, the transfer status variable 415 is identified as "complete."

In the message 174, the source variable 411 is indicated to be application K, the destination variable 413 is indicated to be application L, the transfer status 415 is indicated as "start," the direction 417 is indicated as "send," the transfer type 419 is indicated as a "file transfer," the generate flag variable 403 is indicated as "No," and the transaction details variable 407 may contain any desired content. In FIG. 3C, application K and application L form a second application pair that has a different rules engine for generating a correlation value. Accordingly, the correlation variable 405 of message 174 contains the value "F-165", while the previous correlation variable 406 contains the value "File165," which is the correlation value generated by applications J and K.

In FIG. 3D, the application K has completed sending the object 165 to application L and has sent a message 175 confirming the same to the tracking system 120. In the message 175, the values of the source variable 411, the destination variable 413, the direction 417, the transfer type 419, the generate flag variable 403, the correlation variable 405, and the transaction details 407 remain the same as in message 174. In message 175, however, the transfer status variable 415 is identified as "complete". The previous correlation variable 406 is set to null since the correlation used in the previous message is the current correlation.

The application L has begun receiving the object 165 in FIG. 3D and has sent a message 176 to the tracking system 120. In the message 176, the source variable 411 is still indicated to be application K, the destination variable 413 is still indicated to be application L, the transfer status 415 is indicated as "start," the direction 417 is indicated as "receive," the transfer type 419 is indicated as a "file transfer," and the generate flag variable 403 is indicated as "No,". The correlation variable 405 contains the value "F-165," which was generated based on rules associated with the pairing of application K and application L. The previous correlation variable 406 is set to null since application L does not know the correlation used between applications J and K. The transaction details variable 407 may contain any desired content, which is represented in FIG. 3D by "XXXX."

FIGS. 4-13 show how the tracking system 120 uses the correlation data and other information received in the messages to associate messages stemming from a common business event. FIG. 4 is a schematic block diagram of the tracking system 120 of FIG. 1 implemented as a data management platform (DMP) 200. The DMP 200 includes the collector module 122, the aggregator module 124, and the reporter module 126 of the tracking system 120. The collector module 122 and reporter module 126 are coupled to the network 100 to receive and send messages or other data. The collector module 122 includes a message receiver 210 that is configured to receive a variety of message types (e.g., XML messages, application-specific messages, etc.). The message receiver 210 converts the received messages 117 to a common format (e.g., XML messages) for processing within the DMP 200 as will be disclosed in more detail herein.

The aggregator module 124 includes a queue manager (e.g., a JMS queue manager) 215 that controls when the messages received at the collector module 122 are processed. The queue manager 215 also may receive certain types of messages (e.g., XML messages) 119 directly from the generating applications. Example queue managers 215 may direct the collected messages to the reporter module 126 or to other portions of the aggregator module 124 for consumption. The aggregator module 124 also includes a core 220 that is configured to process the messages received from the queue manager 215. For example, the core 220 is configured to correlate the messages pertaining to the same business event as will be described in more detail herein. In certain implementations, the aggregator module 124 also includes a value added (VA) processor 235 and/or a business activity monitoring (BAM) server 240, which will be disclosed in more detail herein.

The event reporter 126 includes a present module 250, a route module 260, and a notify module 270. The present module 250 is configured to generate a display 131 of information pertaining to one or more business event processed by the core 220. The route module 260 is configured to forward a message 135 processed or generated by the core 220 to an application or other software component (e.g., application 116 or application 118 of FIG. 1) for consumption. The notify module 270 is configured to generate and send a message (e.g., an alert) 133 to a user (i.e., a human being) as will be disclosed in more detail herein.

Figure 5:
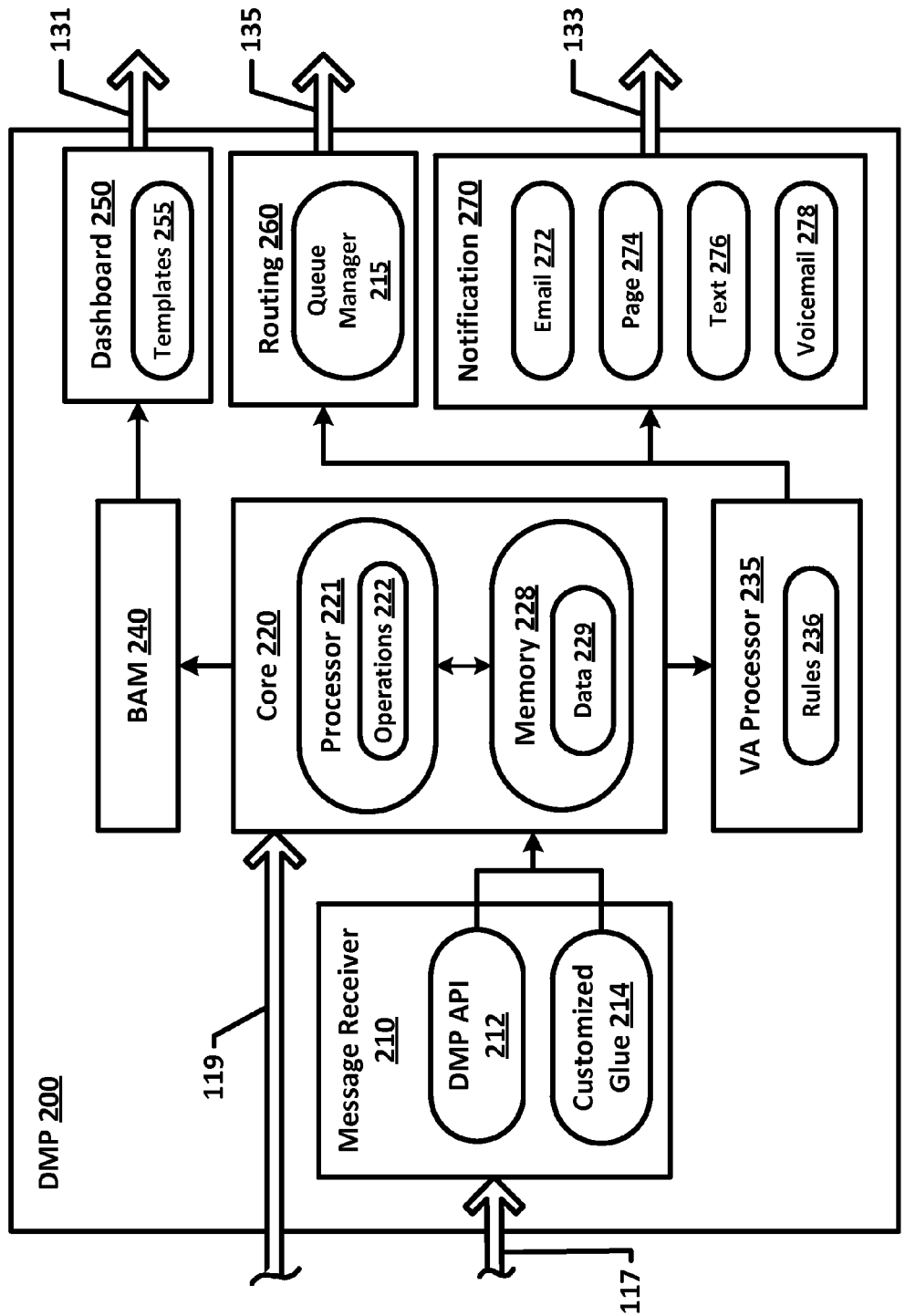
FIG. 5 is a schematic block diagram showing how data flows through the DMP of FIG. 4.

FIG. 5 is a schematic block diagram showing how data flows through the DMP 200. Messages are received at the receiver 210 (e.g., from the network 100). In some implementations, the message receiver 210 is configured to receive and process messages having a variety of formats. For example, the message receiver 210 may be configured to receive and direct application generated messages 117 to the queue manager 215 (FIG. 4) for delivery to the core 220. The message receiver 210 also may be configured to receive other types of messages (e.g., MQ messages, application-specific messages, etc.) 117 and to translate these messages 117 into a common message type (e.g., XML messages) for consumption by the core 220.

The message receiver 210 includes a varieties of application programming interfaces (APIs) and glues (i.e., format converters) by which the message receiver 210 can receive and process messages from various types of applications. In the example shown in FIG. 3, the message receiver 210 includes a DMP-specific API 212 configured to receive messages in a DMP-readable format (e.g., an XML message). The message receiver 210 also includes one or more application-specific glues 214 for applications unable to communicate via another type of readable message. The message receiver 210 converts the received messages to a common, DMP-readable format (e.g., an XML message) and forwards the converted message to the core 220 (e.g., via the queue manager 215).

In some implementations, the core 220 receives the messages 117 from the message receiver 210 (e.g., via the queue manager 215) and performs various operations on the messages (e.g., parse, correlate, etc.). In other implementations, the core 220 receives messages 119 directly from the generating applications. In some implementations, the core 220 includes one or more processors 221 that perform one or more operations 222 based on the received messages. The core 220 also includes memory 228 at which details 229 pertaining to the business events being tracked and/or the received messages are stored. In some implementations, the core 220 forwards (e.g., pushes) the results of the performed operations to the VA processor 235 and/or BAM server 240. In other implementations, the VA processor 235 and/or BAM server 240 periodically check the memory of the core 220 to determine whether any action should be taken.

In certain implementations, the VA processor 235 includes a rules engine 236 that determines the steps to be taken by one or more modules of the reporter 126. For example, in some implementations, the VA processor 235 provides instructions to the notify module 270 to send a message providing information pertaining to a transaction status (e.g., initialization, completion, error) 133 to one or more users (i.e., a human beings). For example, the notification module 270 may be configured to send an email to one or more users. In other implementations, the notification module 270 is configured to page one or more users (e.g., via a cellular phone, smartphone, or intercom system). In still other implementations, the notification module 270 is configured to send a text message to one or more users (e.g., to the user's cellular phone or smartphone). In still other implementations, the notification module 270 is configured to send a voicemail (e.g., a prerecorded voicemail) to one or more users (e.g., to the user's landline phone, cellular phone, smartphone, email account, etc.).

In other implementations, the VA processor 235 provides instructions to the route module 260 to send a message 135 to one or more applications. In some implementations, the route module 260 sends an XML message 135 or another type of message to one or more applications within the network 100 to confirm a status of a transaction, to confirm receipt of a message, or to otherwise provide information to the application. In certain implementations, the route module 260 sends a message 135 to an application within the processing system 110 (FIG. 1). In certain implementations, the router module 260 utilizes the queue manager 215 to send messages out from the DMP 200 to the network 100.

In other implementations, the BAM server 240 generates and/or formats the data to be presented to a user. For example, the BAM server 240 may generate customized webpages (referred to herein as dashboards) 131 based on the information to be presented to the specific user. In other implementations, the BAM server 240 may provide the appropriate data to the present module 250 to be prepared as one or more dashboards (i.e., web pages) 131 to be presented to a user via one or more display devices 132. In certain implementations, the dashboards 131 include templates 255 that the present module 250 and/or the BAM server 240 populates with information obtained from memory (e.g., one or more databases) of the DMP 200 as will be disclosed in more detail herein. The present module 250 also formats the dashboards for display over one or more types of browsers.

Figure 6:
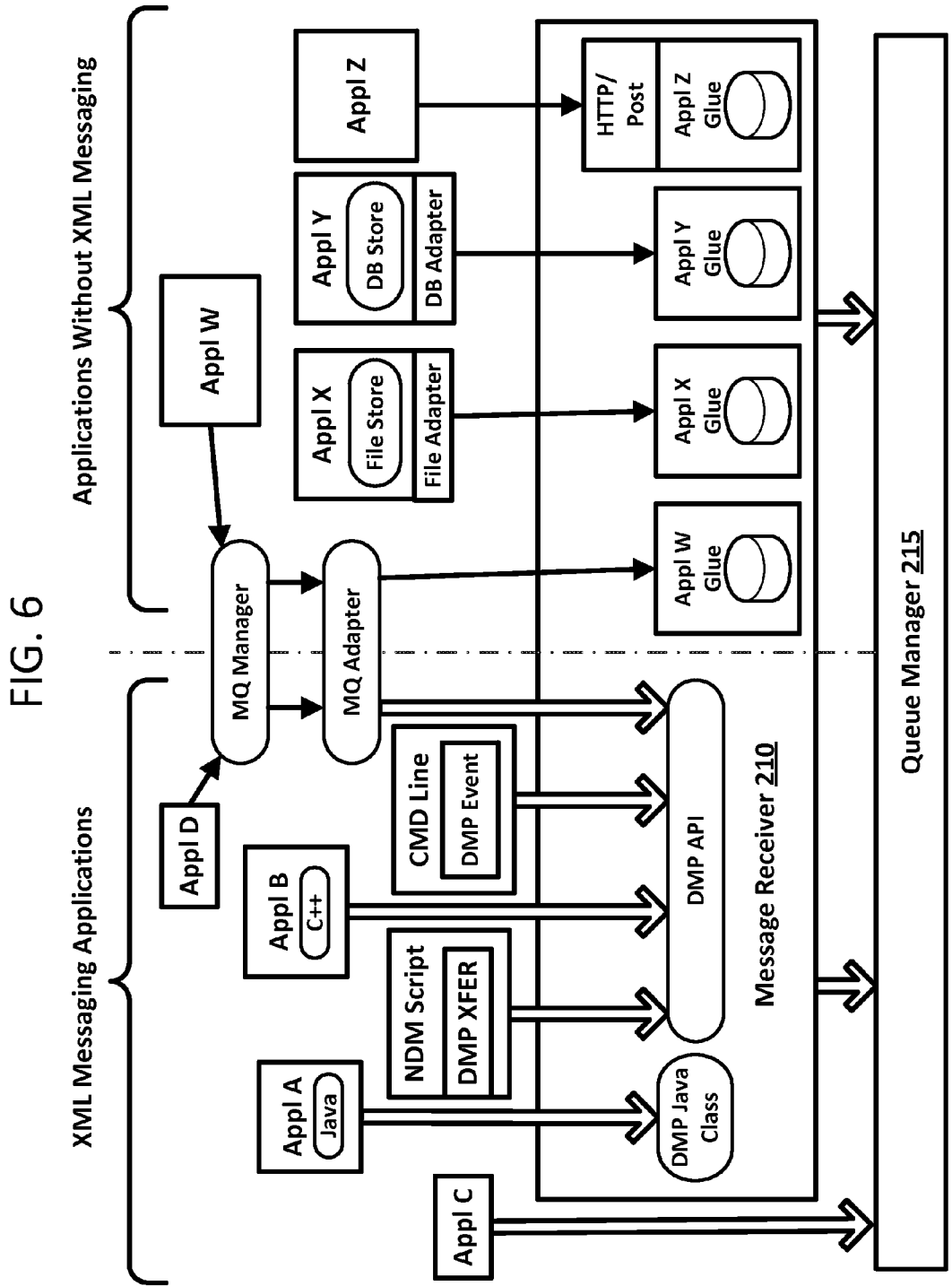
FIG. 6 is a schematic block diagram showing a variety of applications communicating with the message receiver to provide messages to the DMP in accordance with the principles of the present disclosure.

FIG. 6 is a schematic block diagram showing a variety of applications communicating with the message receiver 210 to provide messages to the DMP 200. The message receiver 210 is configured to receive the messages, convert the messages to a common format, and to forward the converted messages to the queue manager 215. In the example shown, the message receiver 210 provides XML messages (see Appendix A, which contains an abridged example XM message schema) to the queue manager 215. In other implementations, however, the message receiver 210 may convert the messages to any desired format for processing by the DMP 200.

The applications shown in FIG. 6 are arranged so that applications capable of producing messages in a format readable by the DMP 200 are located on the left side of the paper and applications not capable of producing DMP-readable messages are located on the right side of the paper. The applications shows on the left side of the paper generate DMP-formatted messages (e.g., XML messages) and send the DMP-formatted messages to the DMP API 212 of the message receiver 210, which forwards the DMP-formatted messages to the queue manager 215. The applications shows on the right side of the paper generate other types of messages and send these messages to the application-specific glues 214 of the message receiver 210, which uses the glues 214 to convert the messages to DMP-formatted messages that may be provided to the queue manager 215.

For example, in some implementations, the DMP 200 is configured to read XML messages. In such implementations, XML messages may be generated and sent by a Network Data Mover (NDM) script, a command (CMD) Line, a first application A utilizing C++, and a second application B utilizing a DMP Java class. Certain types of applications (e.g., a third application C) may be configured to internally generate and send an XML message to the queue manager 215. In still other implementations, certain types of applications (e.g., a fourth application D) include MQSeries® applications that may utilize an MQ manager and MQ adapter to send an XML message to the receiver 210.

In the example shown, applications W, X, Y, and Z are not capable of generating XML messages. Rather, application W is configured to generate an MQSeries® message that may be converted to an XML message by the receiver 210 using a Glue specific to application W. Application X includes a file store and a file adapter that are configured to generate and send non-XML messages to the receiver 210. The receiver 210 converts the messages from application X to XML messages using a Glue specific to the adapted file type of application X. Application Y includes a data store and a database adapter that are configured to generate and send non-XML messages to the receiver 210. The receiver 210 converts the messages from application Y to XML messages using a Glue specific to the adapted data store type of application Y. Application Z is configured to generate and send an HTTP/Post message to the receiver 210, which converts the messages to XML messages using a Glue specific to application Z.

Figure 7:
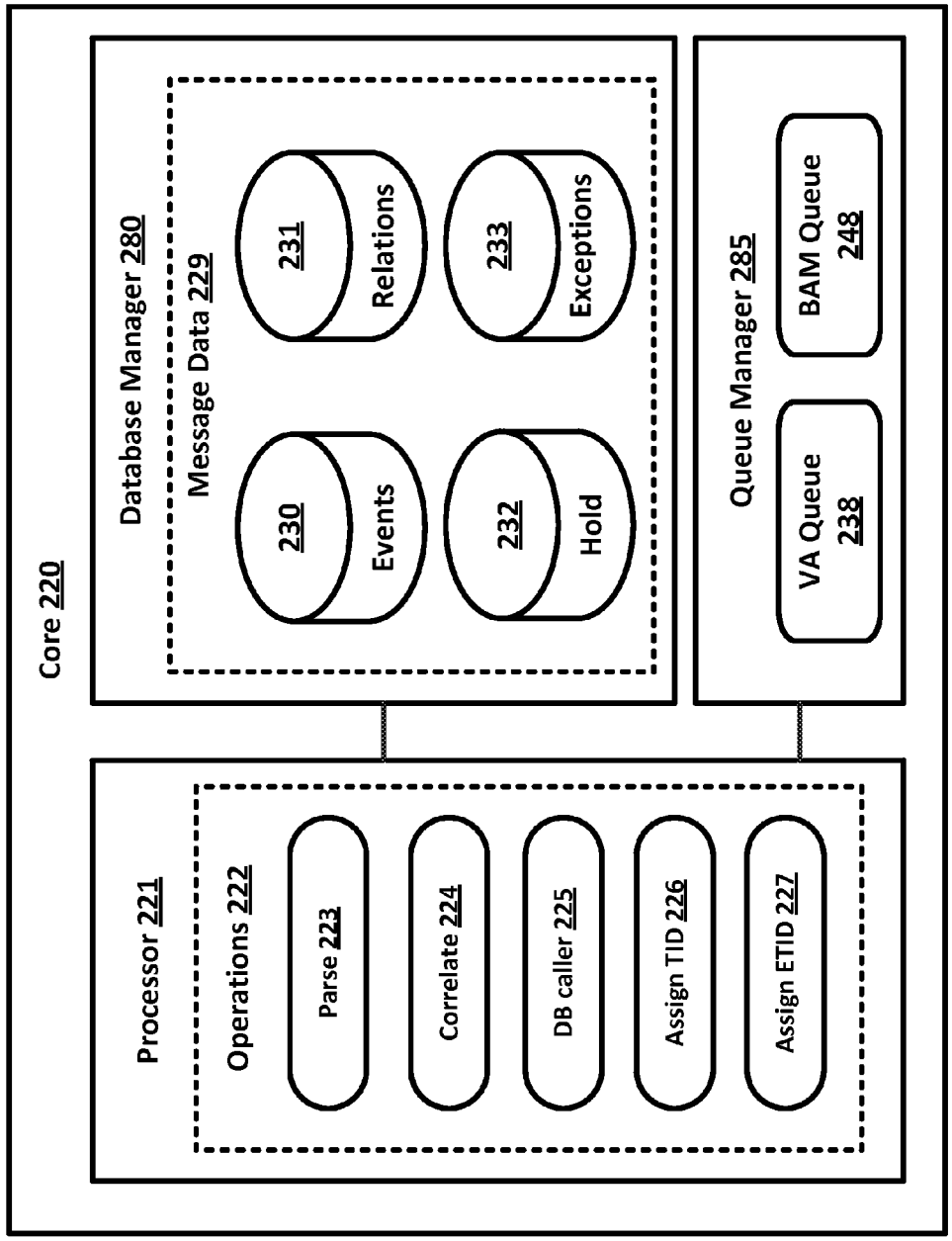
FIG. 7 is a schematic block diagram of an example implementation of a DMP core including a plurality of data stores.

FIG. 7 is a schematic block diagram of an example implementation of a DMP core 220. The example DMP core 220 shown includes a processor 221, a database manager 280, and a queue manager 285. The processor 221 is configured to execute a plurality of operations 222. For example, in some implementations, the processor 221 is configured to parse 223 the received messages, correlate 224 the received messages, perform various database (DB) calls 225, assign tracking numbers 226 to the received messages, and assign error tracking numbers 227 to the received messages. In other implementations, the processor 221 may be configured to perform any desired operation.

In some implementations, the database manager 280 is configured to store message data 229 including transaction details and/or event metadata. In certain implementations, the message data 229 is stored in one or more data stores (e.g., databases). In the example shown, the message data 229 is stored in an Events data store 230, a Relations data store 231, a Hold data store 232, and an Exceptions data store 233. In other implementations, however, the message data 229 may be stored in a greater or lesser number of databases. In one example implementation, the database manager 280 is implemented with an MSSQL database server. In still other implementations, the message data 229 may be otherwise stored in memory.

The Events data store 230 contains a record of all messages received at the tracking system and an indication of the correlation status of each message. For example, the Events data store 230 may indicate whether each message has been associated with a unique tracking ID and added to the Relations data store 231, has been added to the Hold data store 232, or has been added to the Exceptions data store 233.

The Exceptions data store 233 contains a record of all errors stemming from the inability to correlate an incoming message. For example, the Exceptions data store 233 contains stale messages (see FIG. 13 and associated text herein) from the Holds data store 232. The Exceptions data store 233 also contains messages that match too many (e.g., more than one) previous messages. The Exceptions data store 233 also contains messages that have missing information (e.g., do not contain any correlation information). In some implementations, the entries in the Exceptions data store 233 are periodically reviewed and processed manually by one or more users.

The Relations data store 231 contains a record of all messages that have been associated with a unique tracking ID, either by being associated with a newly generated tracking ID or by being correlated to a previous message having a tracking ID. The hold data store 232 contains a record of all messages that should correlate to previous messages, but have not yet been matched to their previous messages. For example, the hold data store 232 contains messages that have a generate flag variable with the value false and that do not match any messages stored in the Relations data store 231. The utilization of these databases will be explained herein with reference to FIGS. 9-13.

In some implementations, the queue manager 285 includes a VA queue 238 that includes information to be submitted to the VA processor 235. The information submitted to the VA queue 238 includes incoming messages or portions (e.g., variable values) thereof. The VA processor 235 may consume the information in the VA queue 238 to provide notification to a user and/or routing of the message to another application. In certain implementations, the information submitted to the VA queue 238 includes transaction details 407. In certain implementations, the information submitted to the VA queue 238 includes application-specific details 421 (FIG. 2).

In some implementations, the queue manager 285 also includes a BAM queue 248 that includes information to be submitted to the BAM server 240. The information submitted to the BAM queue 248 includes incoming messages or portions (e.g., variable values) thereof. For example, the BAM queue 248 receives a tracking ID associated with each message or portion thereof. The BAM server 240 may consume the information in the BAM queue 248 to generate the dashboards (e.g., web page displays) 250. In certain implementations, the information submitted to the BAM queue 248 includes transaction details 407 of the associated event. In certain implementations, the information submitted to the BAM queue 248 includes application-specific details 421 (FIG. 2).

Figure 8:
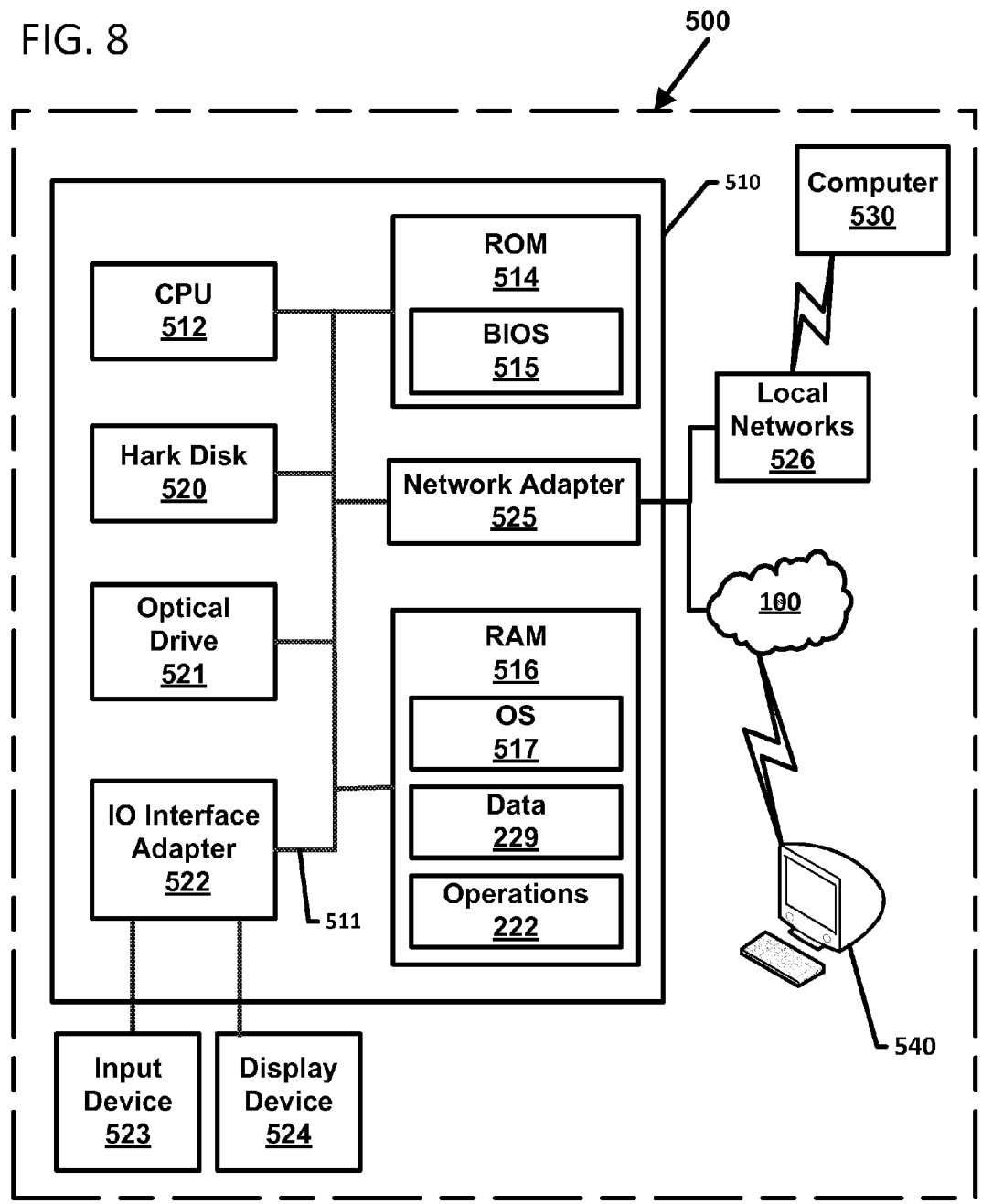
FIG. 8 is an example computing system that is constructed and adapted to implement at least part of the DMP core in accordance with the principles of the present disclosure.

FIG. 8 is an example computing system 500 that is constructed and adapted to implement at least part of the DMP core 220. In general, the computing system 500 includes a computer device (e.g., a person computer, a server computer, a smartphone, a tablet, a laptop, etc.) 510 that is configured to implement at least some of the operations 222 of FIG. 7. The computer device 510 also may be adapted to store some or all of the message data 229 (e.g., one or more databases) pertaining to one or more business events.

One example of the computer device 510 includes a processor unit 512, read only memory (ROM) 514, random access memory (RAM) 516, and a system bus 511 that couples various system components including the RAM 516 to the processor unit 512. The system bus 511 may be any of several types of bus structures including a memory bus or memory controller, a peripheral bus and a local bus using any of a variety of bus architectures. A basic input/output system 515 (BIOS) is stored in ROM 514. The BIOS 515 contains basic routines that help transfer information between elements within the computing system 510.

A number of program modules may be stored on the ROM 514, RAM 516, hard disk drive 520, magnetic disk drive, or optical disk drive 521, including an operating system 517, one or more application programs, other program modules, and program (e.g., application) data. In some implementations, one or more data stores containing message data 229 and/or code for one or more software operations 222 may be stored in the RAM 516. In other implementations, the data stores and/or operations code may be stored elsewhere in memory on the computer device 510.

For example, the computer device 510 also can include a hard disk drive 520 for reading from and writing to a hard disk, a magnetic disk drive (not shown) for reading from or writing to a removable magnetic disk, and/or an optical disk drive 521 for reading from or writing to a removable optical disk such as a CD ROM, DVD, or other type of optical media. The hard disk drive 520, magnetic disk drive, and optical disk drive 521 can be connected to the system bus 511 by a hard disk drive interface (not shown), a magnetic disk drive interface (not shown), and an optical drive interface (not shown), respectively. The drives and their associated computer-readable media provide nonvolatile storage of computer readable instructions, data structures, programs, and other data for the computer device 510.

Although the example environment described herein employs a hard disk drive 520, a removable magnetic disk, and removable optical disk drive 521, other types of computer-readable media capable of storing data can be used in the example system. Non-limiting examples of these other types of computer-readable mediums that can be used in the example operating environment include magnetic cassettes, flash memory cards, digital video disks, solid state disk drives, and Bernoulli cartridges.

A user may enter commands and information into the computer device 510 through input devices 523, such as a keyboard, touch screen, Haptic interface, and/or mouse (or other pointing device). Examples of other input devices 523 may include a microphone, joystick, game pad, satellite dish, haptic interface, and document scanner. These and other input devices are often connected to the processing unit 512 through an I/O port interface 522 that is coupled to the system bus 511. Nevertheless, these input devices 523 also may be connected by other interfaces, such as a parallel port, game port, or a universal serial bus (USB). A monitor 524 or other type of display device is also connected to the system bus 511 via an interface, such as the IO interface 522. In addition to the display device 524, computing systems typically include other peripheral output devices (not shown), such as speakers and document printers.

The computer device 510 may operate in a networked environment using logical connections to one or more remote computers. The remote computer may be a personal computer, a server, a router, a network PC, a peer device or other common network node, and typically includes many or all of the elements described above relative to the computer device 510. In certain embodiments, the network connections can include a local area network (LAN) or a wide area network (WAN). Such networking environments are commonplace in offices, enterprise-wide computer networks, intranets, and the Internet 526. For example, computer device 510 may be connected to one or more remote computer devices 530 through the network 100 or another network.

When used in a WAN networking environment, the computer device 510 typically includes a modem, Ethernet card, or other such means for establishing communications over the wide area network, such as the Internet 526. The modem or other networking components, which may be internal or external, can be connected to the system bus 511 via a network interface or adapter 525. When used in a LAN networking environment, the computer device 510 is connected to the local network 527 through the network interface 525. In a networked environment, program modules depicted relative to the computer device 510, or portions thereof, may be stored in the remote memory storage device. It will be appreciated that the network connections shown are exemplary and other means of establishing a communications link between the computers may be used.

Portions of the preferred embodiment constructed in accordance with the principles of the present invention utilize a computer and are described herein as implemented by logical operations performed by a computer. The logical operations of these various computer implemented processes are generally performed either (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 9:
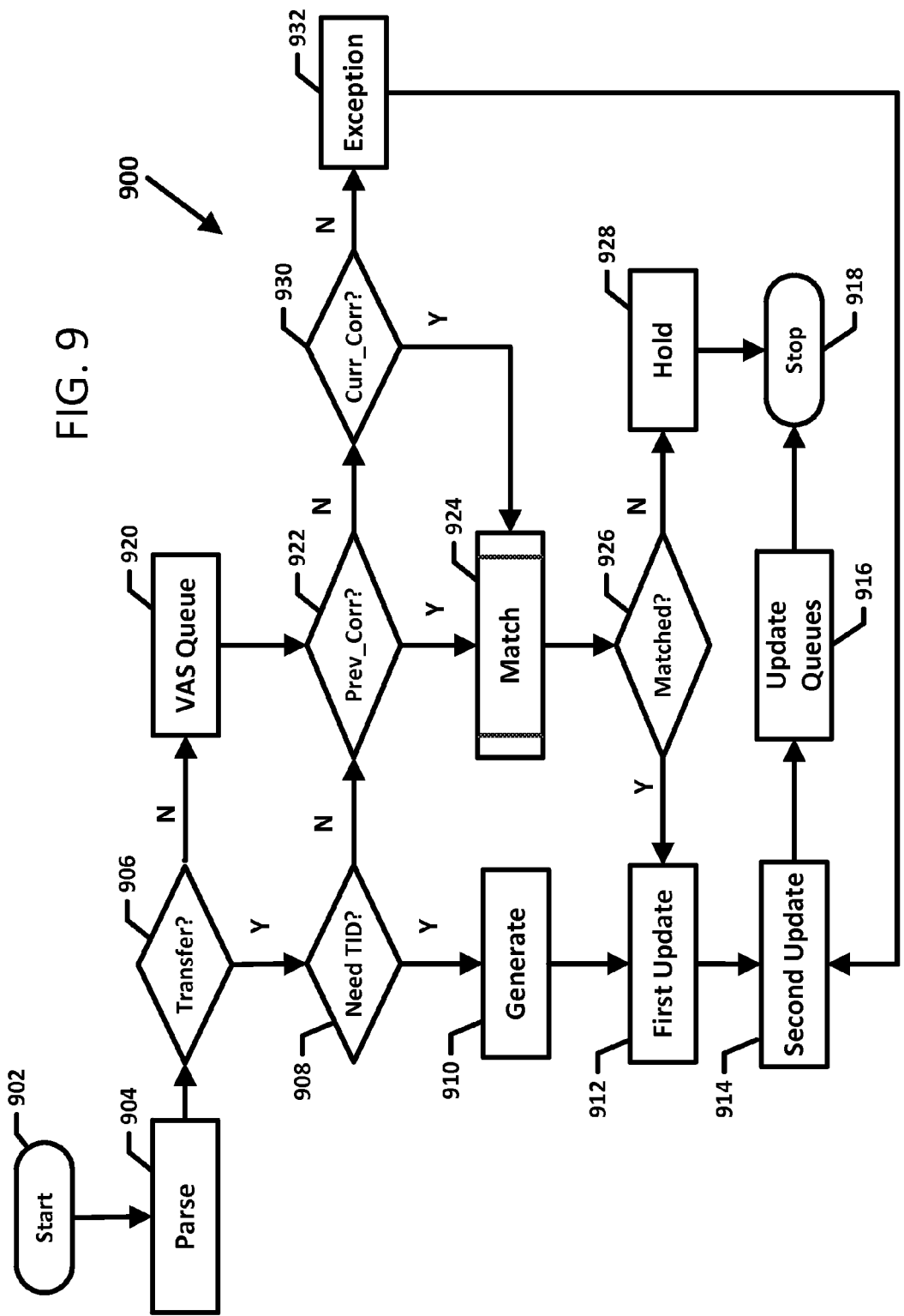
FIG. 9 is a flowchart illustrating an example correlation process executed by the DMP core when a message is received.

FIG. 9 is a flowchart illustrating an example correlation process 900 executed by the DMP core 220 (e.g., by computer device 510) when a message is received. The correlation process 900 analyzes each incoming message to determine whether the message relates to a new business event or an existing business event. If the incoming message relates to a new business event, then a new unique tracking ID is generated and a new data entry including the new tracking ID is created in one or more data stores. If the incoming message relates to an existing business event, then the correlation process 900 reviews the data stores to identify a previously generated tracking number associated with the existing transaction.

The correlation process 900 begins at a start module 902, performs any appropriate initialization procedures, and proceeds to a parse operation 904. The parse operation 904 analyzes the received message to obtain the value of each variable. A first determination module 906 reviews the event type variable 404 of the message to determine whether the message is a "transfer" type message or an "application internal event" type message. If the first determination module 906 determines that the message is a "transfer" type message, then a second determination module 908 reviews the generate flag variable 403 to determine whether the message pertains to a new business event (i.e., a business event that would not already have a tracking ID).

If the generate flag variable 403 contains the value "true," then the correlation process 900 proceeds to a generate operation 910 at which a unique tracking ID is generated for the business event to which the message pertains. A first update operation 912 adds the unique tracking ID to the relations data store 231. The first update operation 912 also associates the value of the correlations variable 405 obtained from the message with the generated tracking ID in the relations data store 231. In certain implementations, the values of other variables from the message (e.g., source application 411, destination application 413, status 415, and direction 417) also are added to the relations data store 231.

A second update operation 914 adds an entry to the Events data store 230 including the generated tracking ID and any additional information obtained from the message (e.g., source application 411, destination application 413, status 415, direction 417, and transaction details 407). A third update operation 916 submits the incoming message or portion thereof to the appropriate reporting queues (e.g., the BAM queue 248 and/or the VA queue 238). In certain implementations, at least the generated tracking ID is submitted to the appropriate queues 238, 248. Additional information obtained from the message (e.g., source application 411, destination application 413, status 415, direction 417, and transaction details 407) also may be submitted to the appropriate queues 238, 248. The correlation process 900 performs any appropriate completion procedure and ends at a stop module 918.

Referring back to the second determination module 908, if the generate flag variable 403 contains the value "false," then the correlation process 900 attempts to identify a previously received message that corresponds with the incoming message so that the incoming message may be associated with a previously generated unique identifier. A third determination module 922 reviews the previous correlation variable 406 of the message.

If the third determination module 922 determines that the previous correlation variable contains a non-null value, then a match function 924 is executed based on the value of the previous correlation variable. The match function 924 determines whether a corresponding previous message has been received and processed by the core 220. In general, the match function 924 compares the incoming message to previously processed messages or data taken therefrom. For example, the match function 924 may compare one or more data fields of the incoming message to the corresponding data fields of previously processed messages. One example process by which the match function 924 may be implemented is disclosed herein with reference to FIG. 10. In other implementations, other types of processes may be used to identify related messages.

If a fourth determination module 926 determines that the match function 924 has identified a related message, then the three update operations 912, 914, 916 are performed using the tracking ID associated with the related message and the correlation process 900 ends at stop module 918. Alternatively, if the fourth determination module 926 determines that the match function 924 did not find a related message, then a fourth update operation 928 adds an entry to the hold data store 232. For example, the fourth update operation 928 may add the previous correlation information and other information obtained from the incoming message to the hold data store 232. The correlation process 900 ends at stop module 918.

Referring back to the third determination module 922, if the previous correlation variable has a null value (i.e., or otherwise indicates that no previous correlation is associated with the business event), then the correlation process 900 proceeds to a fifth determination module 930 at which the value of the correlation variable 405 is analyzed. If the incoming message contained a correlation value, then the match function 924 is called using the correlation value and the correlation process 900 proceeds as above.

If the fifth determination module 930 determines that the incoming message does not include any correlation information, however, then a fifth update operation 932 is executed to add an entry to the exceptions data store 233. In some implementations, the fifth update operation 932 adds the values of one or more variables contained in the incoming message to the exceptions entry. In certain implementations, the fifth update operation 932 also adds an error code or message to the entry. The second and third update operations 914, 916 also are executed to add entries to the events data store 230 and BAM queue 248. The correlation process 900 ends at stop module 918.

Referring back to the first determination module 906, if the incoming message is determined to be an "application internal event" type of message, then the correlation process 900 skips the second determination module 908 and proceeds to a second queue operation 920. The second queue operation 920 submits the incoming message (or variable values thereof) to the VA processor 235, which manages some of the reporting performed by the core 220. From the queue operation 920, the correlation process 900 proceeds to the third determination module 922 to attempt to identify a related previous message and continues as above.

In some implementations, the exceptions data store 233 is manually reviewed periodically. In certain implementations, the exceptions data store 233 is manually reviewed to determine whether a related message can be manually identified for each entry. In certain implementations, the exceptions data store 233 is manually reviewed to determine why the exception was triggered (e.g., why the incoming message could not be matched, why the incoming message did not contain correlations data, etc.).

Figure 10:
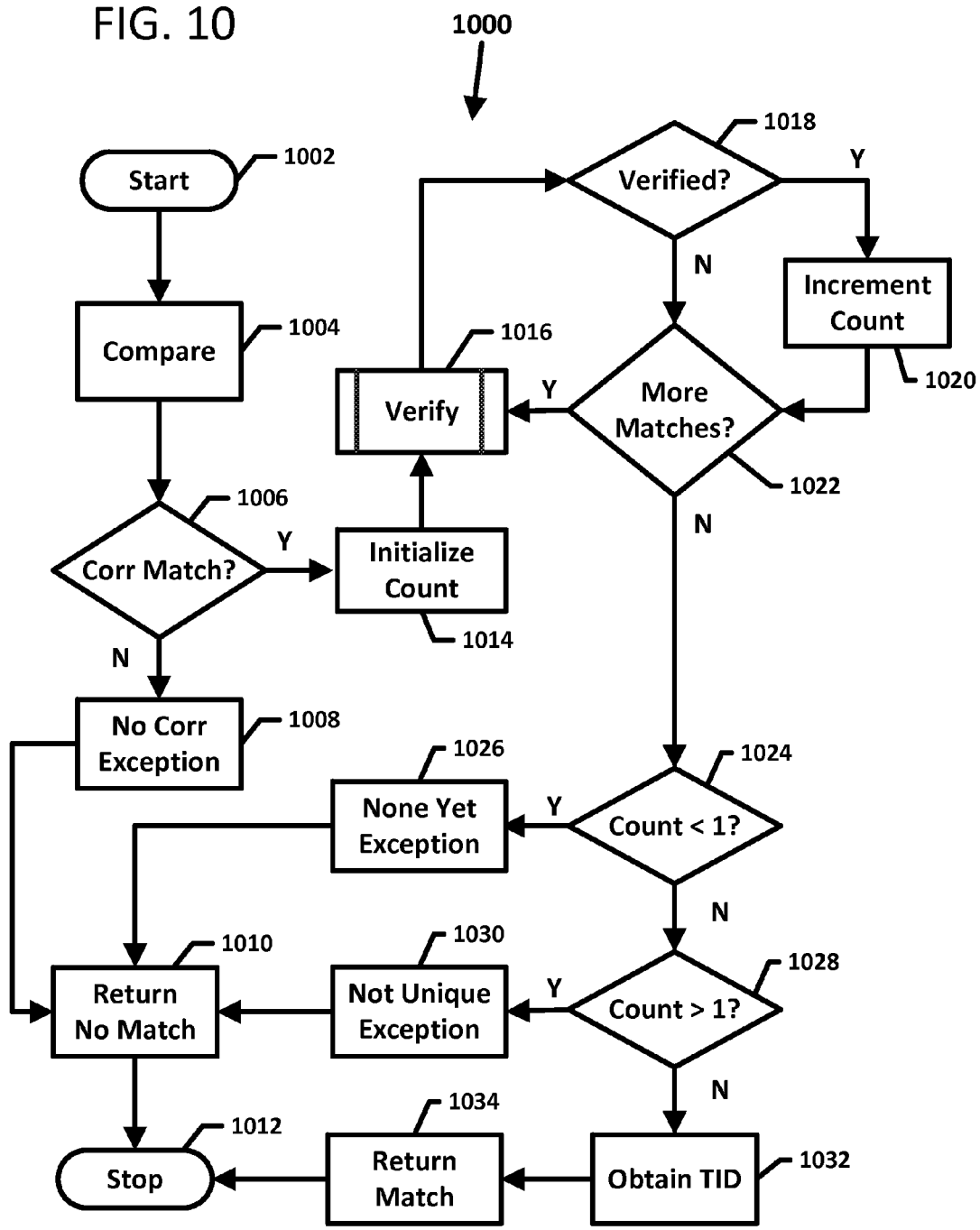
FIG. 10 is a flowchart illustrating an example process flow suitable for use in implementing the match function of the correlation process of FIG. 9.

FIG. 10 is a flowchart illustrating an example process flow 1000 suitable for use in implementing the match function 924 of the correlation process 900 of FIG. 9. As noted above with reference to FIG. 9, the match function 924 is called based on a correlation value (i.e., a current correlation value or a previous correlation value) obtained from the incoming message. The match process 1000 begins at a start module 1002, performs any appropriate initialization procedures, and proceeds to a compare operation 1004.

In general, the compare operation 1004 accesses the relations data store 231 and identifies entries that potentially relate to the same business event as the incoming message. For example, the compare operation 1004 may determine whether the correlation value of the incoming message is the same as the correlation value of any of the entries in the relations data store 231. For example, the compare operation 1004 may perform a database call on the relations store 231 and receive all entries having the correlation value of the incoming message.

If a first determination module 1006 determines that the correlation value of the incoming message does not match the correlation value of any entries in the relations data store 231, then a set operation 1010 causes the match function 924 to return the value "false" or otherwise indicate that a match was not found. The match process 1000 ends at stop module 1012. Alternatively, if the first determination module 1006 identifies at least one match in the relations data store 231, however, then an initialize operation 1014 sets a match counter to zero and the match process 1000 calls a verification function 1016 based on the incoming message and the first potential matched obtained by the compare operation 1004.

The verification function 1016 determines whether the first potential match from the relations data store 231 actually does relate to the same business event as the incoming message. The verification function 1016 analyzes multiple data fields in the incoming message and compares the contents of the data fields to the contents of the corresponding data fields of the first potential match. One example process by which the verification function 1016 may be implemented is disclosed herein with reference to FIG. 11. In other implementations, other types of processes may be used to confirm related messages.

A second determination module 1018 determines whether the verification function 1016 confirmed a match between the first potential match and the incoming message. If the second determination module 1018 determines that the verification function 1016 did confirm a match, then an increment operation 1020 increments the match counter and the verification process 1000 proceeds to a third determination module 1022. However, if the second determination module 1018 determines that the verification function 1016 did not confirm a match, then the verification process 1000 proceeds directly to the third determination module 1022.

The third determination module 1022 determines whether additional potential matches were identified by the compare operation 1004. If additional potential matches were identified, then the verification process 1000 cycles back to calling the verification function 1016 based on the incoming message and the next potential match. This loop continues until the verification function 1016 has been called for each potential match.

A fourth determination module 1024 determines whether or not the match counter remains at zero. If the match counter has not been incremented (i.e., if the verification function did not confirm any of the potential matches), then a first exception operation 1026 updates the exceptions data store 233 to indicate that a related message has not yet been identified. The set operation 1010 causes the match function 924 to return the value "false" or otherwise indicate that a match was not found and the verification process 1000 ends at the stop module 1012.

Alternatively, if the fourth determination module 1024 determines that the match counter has been incremented, then a fifth determination module 1028 determines whether or not the match counter has not been incremented more than once (i.e., if the verification function 1016 confirmed more than one of the potential matches). If the fifth determination module 1028 determines that the match counter is greater than one, then a second exception operation 1030 updates the exceptions data store 233 to indicate that a unique relations data store entry could not be found for the incoming message. The set operation 1010 causes the match function 924 to return the value "false" or otherwise indicate that a match was not found and the verification process 1000 ends at the stop module 1012.

Alternatively, if the fifth determination module 1028 determines that the match counter is equal to one (i.e., if the verification function 1016 confirmed exactly one of the potential matches), then an obtain operation 1032 pulls or otherwise obtains the unique tracking ID from the confirmed match. A second set operation 1034 causes the match function 924 to return the value "true" or otherwise indicate that a match was found. In certain implementations, the set operation 1034 also causes the match function 924 to return with the value of the unique tracking ID obtained from the confirmed match. The verification process 1000 ends at the stop module 1012.

Figure 11:
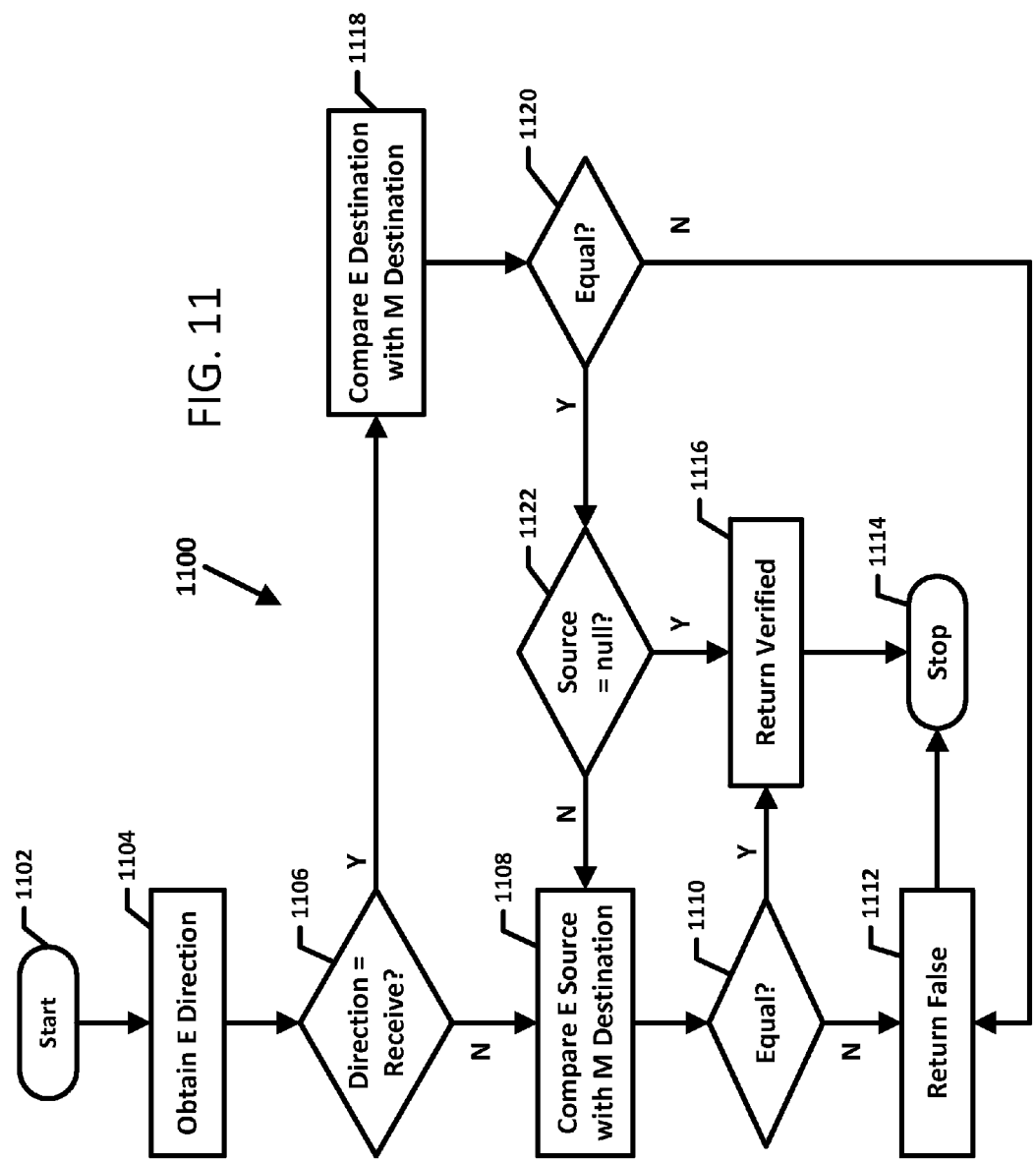
FIG. 11 is a flowchart illustrating an example process flow suitable for use in implementing the verification function of the match process of FIG. 10.

FIG. 11 is a flowchart illustrating an example process flow 1100 suitable for use in implementing the verification function 1016 of the match process 1000 of FIG. 10. As noted above with reference to FIG. 10, the verification function 1016 is called based on the incoming message and a potentially matching entry in the relations store 231. The verification process 1100 begins at a start module 1102, performs any appropriate initialization procedures, and proceeds to an obtain operation 1104.

The obtain operation 1104 reads the contents of the direction field (i.e., the value of the direction variable) 417 of the incoming message. A first determination operation 1106 determines whether or not the incoming message has the direction "receive." If the direction is not "receive" (i.e., if the direction is "send" or "pull"), then a compare operation 1108 obtains the contents of the source application field 411 of both the incoming message and the potential match.

If a second determination module 1110 determines that the source application identified by the incoming message differs from the source application identified by the potential match, then a first return operation 1112 causes the verification function 1016 to return false or otherwise indicate that the match is not confirmed. The verification process 1100 performs any appropriate completion procedures and ends at the stop module 1114.

However, if a second determination module 1110 determines that the source application identified by the incoming message is the same as the source application identified by the potential match, then a second return operation 1116 causes the verification function 1016 to return true or otherwise indicate that the match is confirmed. The verification process 1100 performs any appropriate completion procedures and ends at a stop module 1114.

Referring back to the first determination module 1106, if the direction of the incoming message is "receive," then a second compare operation 1118 obtains the contents of the destination application field 413 of both the incoming message and the potential match. If a third determination module 1120 determines that the destination application identified by the incoming message is not the same as the destination application identified by the potential match, then the first return operation 1112 causes the verification function 1016 to return false or otherwise indicate that the match is not confirmed. The verification process 1100 performs any appropriate completion procedures and ends at the stop module 1114.

However, if the third determination module 1120 determines that the destination application identified by the incoming message is the same as the destination application identified by the potential match, then a fourth determination module 1122 determines whether either the incoming message or the potential match do not identify an application source (i.e., the source application data field 411 of either the incoming message or the potential match is null, blank, or otherwise without content).

If the fourth determination module 1122 determines that the source application data field of either the incoming message or the potential match is null, then the second return operation 1116 causes the verification function 1016 to return true or otherwise indicate that the match is confirmed. The verification process 1100 performs any appropriate completion procedures and ends at a stop module 1114. However, if the fourth determination module 122 determines that both the incoming message and the potential match identify a source application, then the verification process 1100 proceeds back to the first compare operation 1108 and continues therefrom until ending at stop module 1114.

In general, it is possible for the tracking system to receive and/or process a first incoming message sent from a first application prior to receiving and/or processing a second incoming message sent from a second application that is upstream of the first application in the processing system. For example, in certain types of networks 100, the tracking system 120 may receive the message 123 from Application 114 prior to receiving the message 121 from application 112, even though the event triggering message 121 occurs before the event triggering message 123. In such cases, the tracking system 120 would attempt to match message 123, find no matches in the relations data store 231, and add message 123 (i.e., or the data therefrom) to the hold data store 232.

Subsequently, the tracking system 120 will receive and process message 121 including generating a unique tracking ID (if message 121 indicates that a new business event has been initiated). Alternatively, the tracking system 120 may correlate message 121 to a previous message and obtain a unique tracking ID from the previous message. Accordingly, the message 121 is added to the relations data store 231 with the appropriate unique tracking ID. To correlate the held message 123 to processed message 121, a hold update process is implemented. In some implementations, the DMP core 220 may automatically execute the hold update process periodically. In other implementations, however, the hold data store 232 may be manually checked and modified by one or more users.

Figure 12:
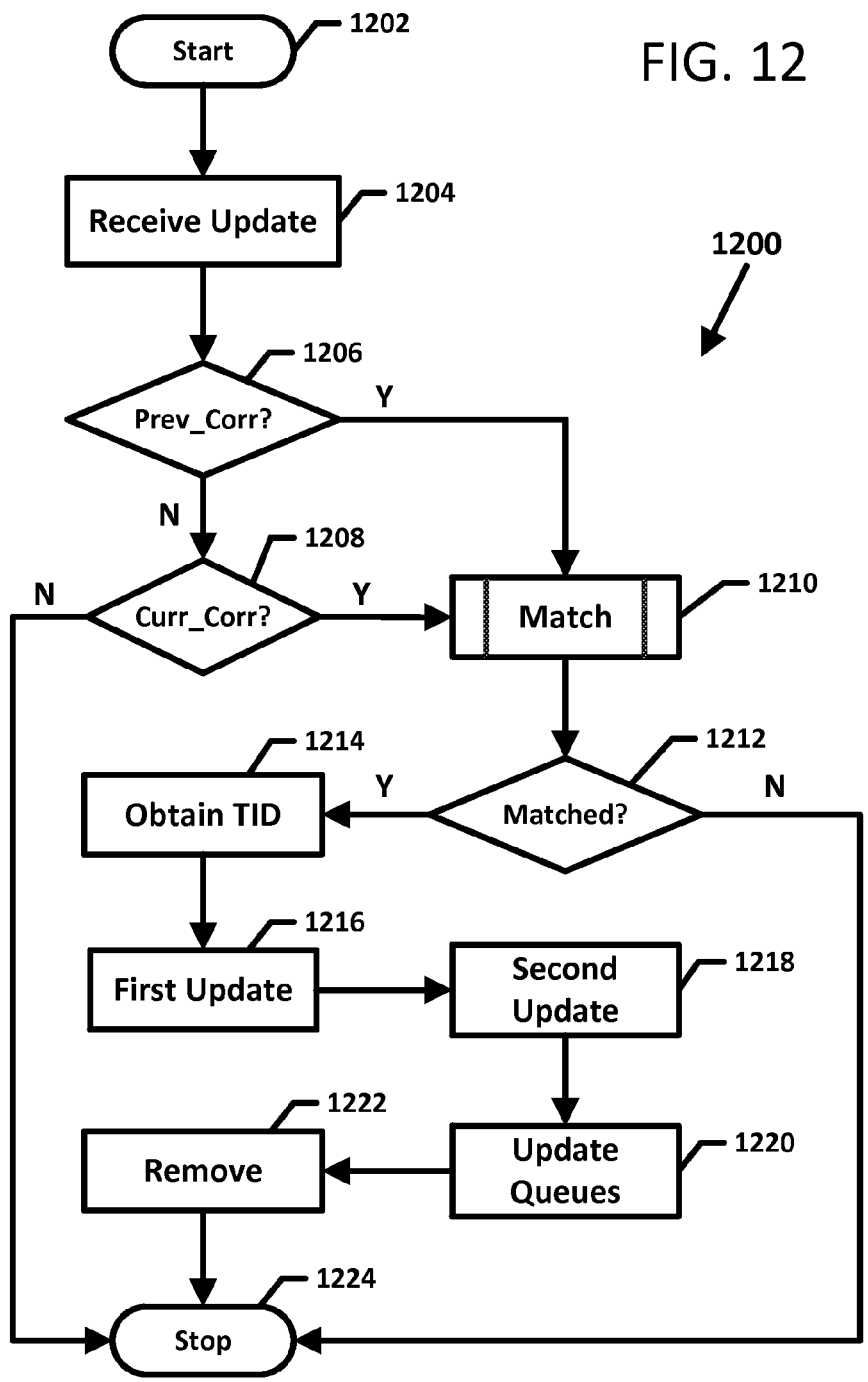
FIG. 12 shows an update process by which the hold data store is periodically checked to determine whether or not any entries stored in the hold data store correlate with any incoming messages.

FIG. 12 shows an update process 1200 by which the hold data store 232 is periodically checked to determine whether or not any entries stored in the hold data store 232 correlate with any incoming messages. In certain implementations, the update process 1200 executed periodically based on one or more processed messages (i.e., updates) that are associated with unique tracking numbers and stored in the relations data store 231. In the example shown, the update process 1200 is configured to check the hold data store 232 for a matching entry to a single update. In other implementations, however, the update process 1200 may iteratively check the hold store 232 for matching entries to multiple updates.

The example update process 1200 begins at a start module 1202, performs any appropriate initialization procedures, and proceeds to a receive operation 1204. In some implementations, the receive operation 1204 obtains at least correlation information (i.e., content of the previous correlation and/or current correlation data fields) from an update. In certain implementations, the contents of other data fields (e.g., source application 411, destination application 413, status 415, and direction 417) also are obtained. In some implementations, the receive operation 1204 obtains the information by accessing the relations data store 231. In other implementations, the receive operation 1204 obtains the correlations information directly from an incoming message.

First and second determination modules 1206, 1208 call the match function 1210 based on the correlation information of the update. As shown in the flowchart, the match function 1214 is called based on previous correlation information of the update if such information exists (see determination module 1206). The match function 1214 is called based on current correlation information only when no previous correlation information is available (see determination module 1208).

The match function 1210 determines whether a subsequent message relating to the update has been previously received and stored in the hold data store 232. In general, the match function 1210 compares one or more data fields of the update to the corresponding data fields of entries in the hold store 232. One example process by which the match function 1210 may be implemented is disclosed herein with reference to FIG. 10. When implemented as match function 1210, however, the first compare operation 1004 of the match process 1000 accesses the hold data store 232 instead of the relations data store 231. In other implementations, other types of processes may be used to identify related messages.

A third determination module 1212 determines whether or not the match function 1214 returns with a confirmed match. If a match is not found in the hold store 232, then the update process 1200 performs any appropriate completion procedures and ends at a stop module 1222. As disclosed above with reference to FIGS. 9-11, exceptions may be generated and stored in an exceptions data store 233 if multiple matches are found in the hold data store 232.

If the third determination module 1212 determines that a match has been found, however, then an obtain operation 1214 determines the unique tracking ID of the update and a first update operation 1216 adds a new entry to (or otherwise updates) the relations data store 231 based on the obtained unique tracking ID and information associated with the held message. A second update operation 1218 adds a new entry to (or otherwise updates) the events data store 230 based on the obtained unique tracking ID and information associated with the held message. A third update operation 1220 submits the held message (or information therefrom) to the appropriate queues (e.g., the VA queue 238 and/or the BAM queue 248).

A remove operation 1222 deletes the held message from the hold data store 232. The update process 1200 performs any appropriate completion procedures and ends at a stop module 1222. Accordingly, the hold data store 232 contains messages that have not yet been matched to processed related messages. Message entries also can be reviewed from the hold store 232 after being held for longer than a predetermined period of time (i.e., when the held message is considered "stale"). In general, stale hold entries are removed from the hold store 232 and added to the exceptions store 234 (e.g., to be reviewed manually).

Figure 13:
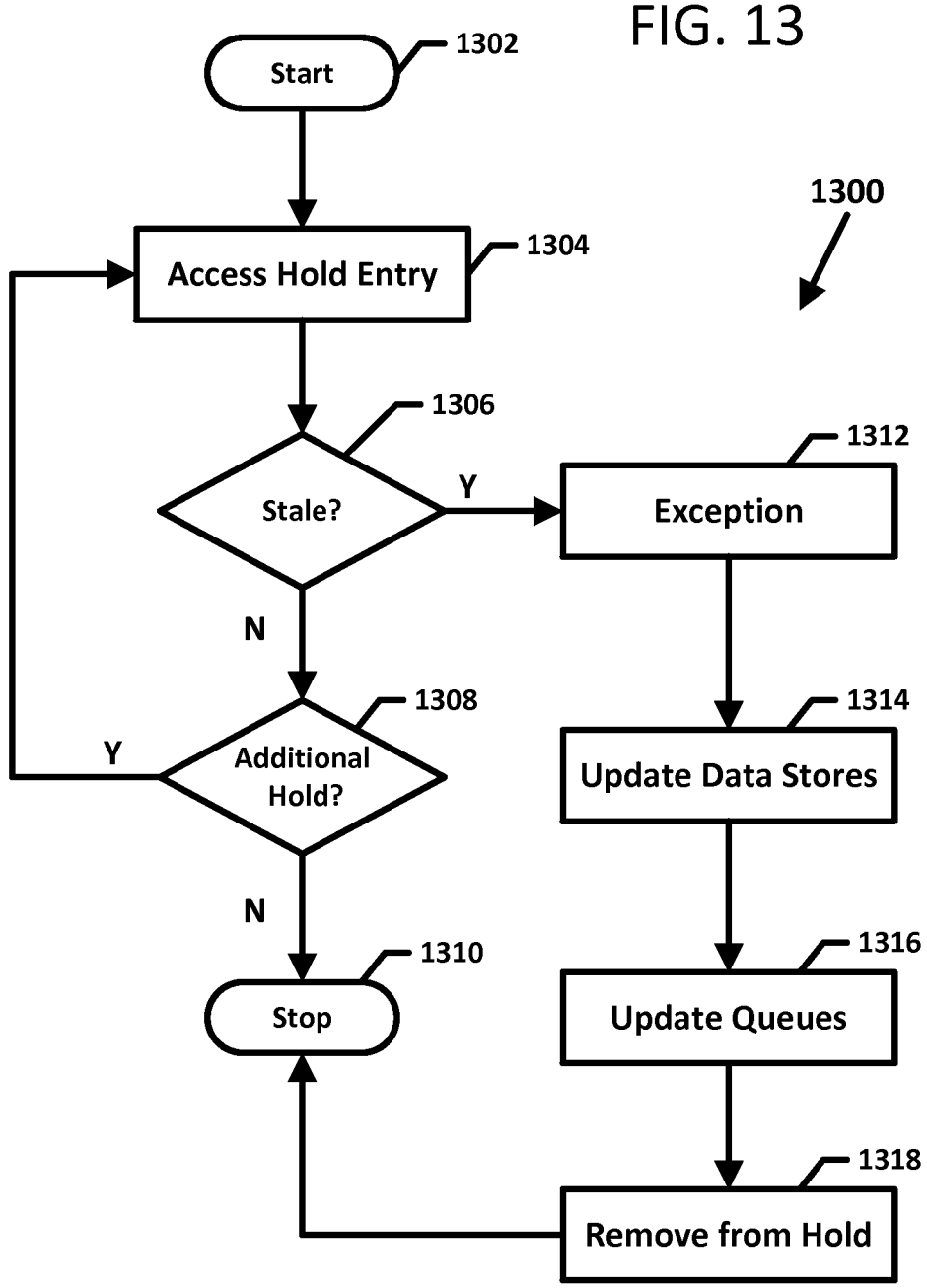
FIG. 13 is a flowchart illustrating an operational flow for an example clean-up process by which stale entries are removed from the hold store.

FIG. 13 is a flowchart illustrating an operational flow for an example clean-up process 1300 by which stale entries are removed from the hold store 232. The clean-up process 1300 begins at a start module 1302, performs any appropriate initialization procedures, and proceeds to an access operation 1304 at which a first held entry is obtained from the hold store 232.

A first determination module 1306 determines whether or not the first held entry is considered to be stale. The criteria by which a held entry is judged stale may vary between systems or even between types of messages. In some implementations, a held message is stale when the message has been stored in the hold data store 232 for a predetermined period of time. In other implementations, the first determination module 1306 may consider when the held message was generated by the application of the processing system. In still other implementations, the first determination module 1306 may consider any desired information to determine whether the held message is stale.

If the first determination module 1306 determines that a held message is not stale, then the clean-up process 1300 cycles back to the access operation 1304 to obtain the next held message and begins again. When the clean-up process 1300 has checked all of the entries in the hold data store 232 (as determined by module 1308), then the clean-up process 1300 performs any appropriate completion procedures and ends at a stop module 1310.

If the first determination module 1306 determines that a held message is stale, however, then an exceptions operation 1312 generates an exceptions tracking identifier and updates the exceptions data store 233. A first update operation 1314 updates the events data store 230 to indicate that the held message has been added to the exceptions data store 233. A second update operation 1316 submits the exception tracking identifier and any desired information from the held message to the appropriate queue (e.g., BAM queue 248 and/or VA queue 238). A remove operation 1318 updates the hold store 232 to delete the held message. The clean-up process 1300 performs any appropriate completion procedures and ends at the stop module 1310.

As noted above, the DMP 200 is configured to distribute tracking information to one or more users and/or applications. For example, some tracking information may be provided to one or more queues (e.g., the VA queue 238 and/or the BAM queue 248) to be processed by one or more reporter modules (e.g., present module 250, route module 260, and notify module 270 of DMP 200). In other implementations, the reporter modules 250, 260, 270 may access one or more of the data stores (e.g., the Events data store 230, the Exceptions data store 233, etc.) to obtain the tracking information.

In some implementations, the present module 250 accesses the BAM queue 248 to obtain tracking information to be distributed to one or more users via one or more web pages. FIGS. 14-17 show example web page templates 1400, 1500, 1600, 1700 that may be populated with tracking information by the present module 250.

Figure 14:
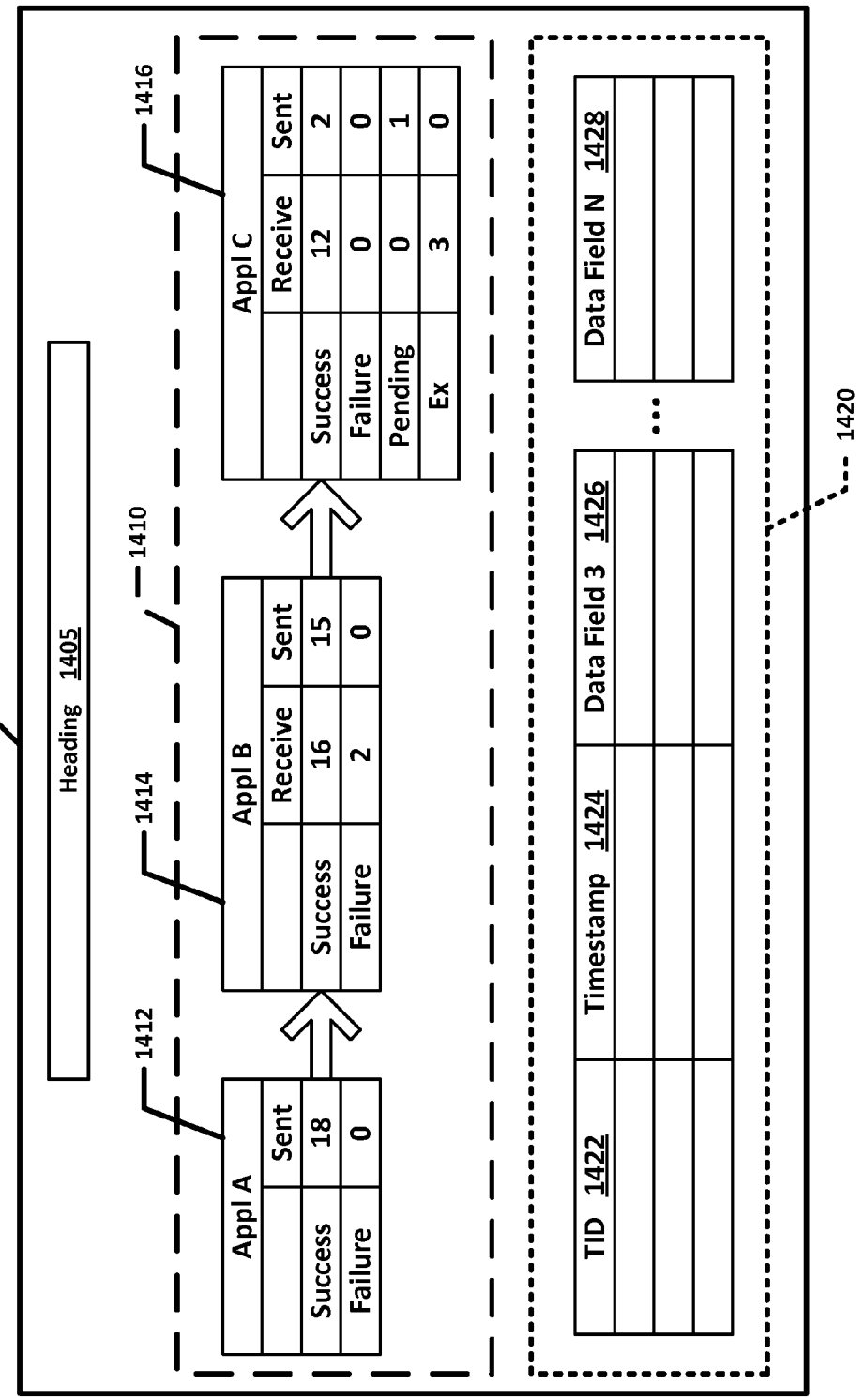
FIGS. 14-17 show example web page templates that may be populated with tracking information for display to one or more users.

FIG. 14 shows one example overview template 1400 that displays transfer status and other data for all transfer-type business events within a processing system (e.g., processing system 110) or a portion thereof. The overview template 1400 includes a header 1405 that indicates to a user what information is being presented. The overview template 1400 also includes a summary section 1410 and a details section 1420. In the example shown, the summary section 1410 is disposed above the details section 1420. In other implementations, however, the overview template 1400 may be designed and configured to otherwise arrangement the sections 1410, 1420.

The summary section 1410 graphically portrays the process flow between applications. For example, in some implementations, the summary section 1410 includes tables pertaining to the applications in the process flow. Arrows extend between application tables to show the process flow between application pairs. In the example shown, business events flow from "Application A" to "Application B" to "Application C." Accordingly, a first arrow extends from a first table 1412 showing data for Application A to a second table 1414 showing data for Application B. A second arrow extends from the second table 1414 to a third table 1416 showing data for application C.

Each application table 1412, 1414, 1416 displays a count of the number of transfer events occurring within the process flow within a specified data range. The tables 1412, 1414, 1416 sort the transfer events by the type of transfer (e.g., send, receive, pull) and the status of each event (e.g., start, complete, pending, failed, exceeds deadline, duplicate, manually confirmed). For example, the first table 1412 displays a count of the number of "sent" transfer events sorted by the number of events that were successful and the number of events that failed.

The second table 1414 displays a count of the number of transfer events sorted into "receive" transfer events and "sent" transfer events. The transfer events of the second table 1414 are further sorted by the number of events that were successful and the number of events that failed. The third table 1416 displays a count of the number of transfer events sorted into "receive" transfer events and "sent" transfer events. The transfer events of the third table 1416 are further sorted by the status of each transfer event (e.g., by the number of events that were successful, the number of events that failed, the number of events still pending, and the number of events that caused an error).

In certain implementations, each table 1412, 1414, 1416 may display a count for the same status (e.g., all tables show the number of pending transfers by type). In other implementations, each table 1412, 1414, 1416 may be sorted by other criteria. In some implementations, one or more of the tables 1412, 1414, 1416 may be editable by a user accessing the web page. For example, a user may be able to adjust one or more of the counts shown in the table cells. In other implementations, one or more of the counts may be selected by a user to display additional details pertaining to the transfer events associated with the selected count (see FIG. 15).

The details section 1420 shows a high level view of each file transfer event that occurred in the process flow within a specified data range. In some implementations, the details section 1420 shows one or more data fields of each file transfer event that occurred within the process flow. In the example shown, the details section 1420 includes a first data field 1422 for the unique tracking ID of the transfer event and a second data field 1424 for a timestamp of the transfer event. Additional data fields (e.g., "Data Field 3" 1426 through "Data Field N" 1428) also may be displayed. Some non-limiting examples of information that may be displayed in the additional data fields include file name, source application, destination application, status, customer name, internal code, etc.

In certain implementations, one or more of the data fields 1422, 1424, 1426, 1428 may be editable by a user. For example, a user may be able to select a data field and to modify the information contained in the selected data field. In other implementations, one or more transfer events displayed in the details section 1420 may be selected by a user to display additional details pertaining to the selected transfer event. For example, a user may select one of the rows displayed in the details section 1420 to instruct the present module 250 to generate a new web page to display the details of the selected transfer event (see FIG. 16).

Figure 15:
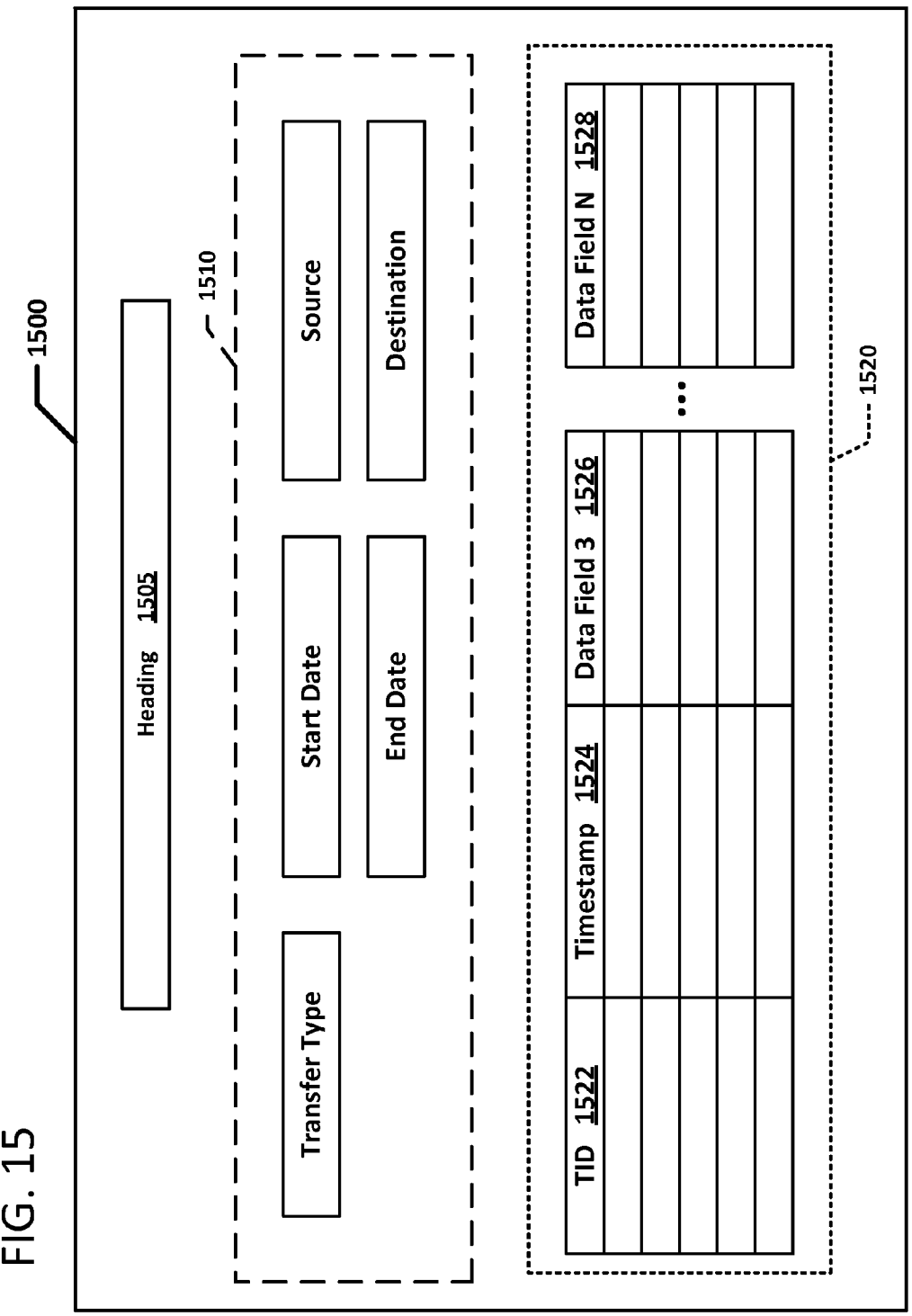

FIG. 15 shows one example count details template 1500 that displays the details pertaining to the transfer events associated with a count displayed in the summary section 1410 of the overview template 1400. For example, a user may click on one of the cells of one of the tables 1412, 1414, 1416 of the summary section 1410 to provide in a count details template the details of the event transfers associated with the count displayed in that cell. In the example shown in FIG. 15, the count details template 1500 displays information pertaining to event transfers of a particular type (e.g., send, receive, etc.) and a particular status (e.g., successful, failed, etc.) between a particular application pair within a given data range.

Some of the criteria on which the event transfers are selected for display (e.g., the selected event type, the selected event status, and the selected application pair) is provided in a heading 1505 of the count details template 1500. The count details template 1500 also includes a summary section 1510 and a details section 1520. In the example shown, the summary section 1510 is disposed above the details section 1520. In other implementations, however, the count details template 1500 may be designed and configured to otherwise arrangement the sections 1510, 1520.

The summary section 1510 displays common details of the transfer events associated with the selected count. In the example shown, the summary section 1510 displays a transfer type (e.g., send, receive, etc.), a start date (i.e., or starting timestamp) for the date range, an end date (i.e., or ending timestamp) for the date range, a source application of the application pair, and a destination application of the application pair. In other implementations, however, other types of information may be displayed.

The count details template 1500 also includes a transfer details section 1520 that shows a high level view of each file transfer event of the selected type and status that occurred between that application pair. In some implementations, the details section 1520 shows one or more data fields of each qualifying file transfer event. In the example shown, the details section 1520 includes a first data field 1522 for the unique tracking ID of the transfer event and a second data field 1524 for a timestamp of the transfer event. Additional data fields (e.g., "Data Field 3" 1526 through "Data Field N" 1528) also may be displayed. Some non-limiting examples of information that may be displayed in the additional data fields include file name, location of file, customer name, internal code, etc.

Figure 16:
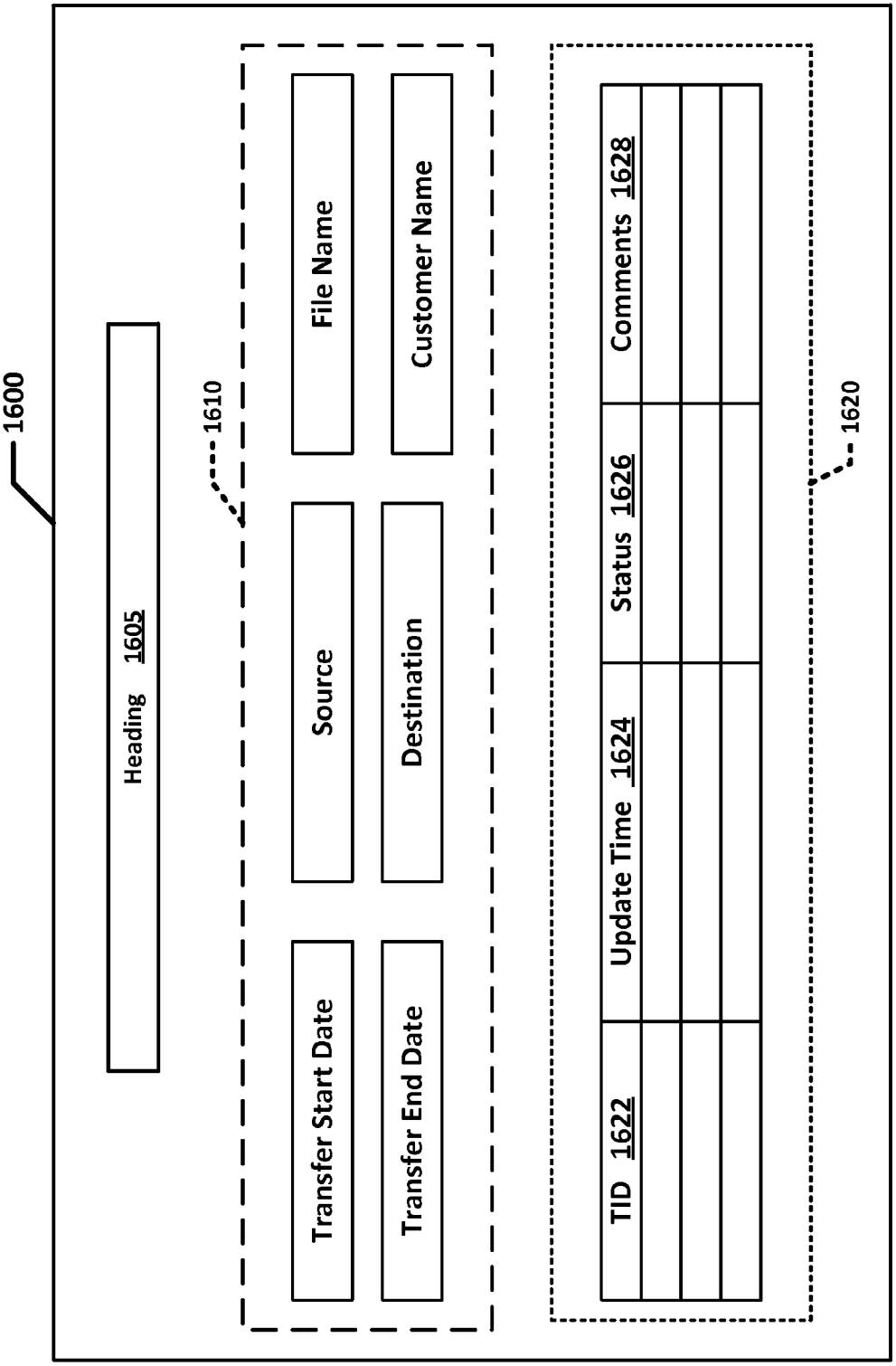

FIG. 16 shows one example historical view template 1600 for a selected transfer event. The historical view template 1600 is populated with information pertaining to a selected transfer event and other transfer events relating to the same business event. For example, a user may click on one of the rows of the details section 1420 of the overview template 1400 of FIG. 14 to instruct the present module to generate a historical view template 1600 shows the details of the selected transfer event and related transfer events.

The historical view template 1600 includes a header 1605 that indicates to a user what information is being presented. For example, the header 1605 may indicate that the web page is displaying a historical view of an event transfer. The historical view template 1600 also includes a summary section 1610 and a lifecycle section 1620. In the example shown, the summary section 1610 is disposed above the lifecycle section 1620. In other implementations, however, the historical view template 1600 may be designed and configured to otherwise arrangement the sections 1610, 1620.

The summary section 1610 contains the criteria used to search for the related event transfers that are displayed in the lifecycle section 1620 of the page. In the example shown, the summary section 1610 displays a start date (i.e., or starting timestamp) for the date range, an end date (i.e., or ending timestamp) for the date range, a file name, a customer name, a source application, and a destination application. In other implementations, however, other types of information may be displayed in the summary section 1610.

The lifecycle section 1620 shows a high level view of each event update of the selected file transfer event. In some implementations, the lifecycle section 1620 shows one or more data fields of each transfer event update. In the example shown, the lifecycle section 1620 includes a first data field 1622 for the unique tracking ID of the transfer event and a second data field 1624 for a timestamp of the update. A third data field 1626 displays a transfer status (e.g., pending, complete, and exceeds deadline) of the transfer event. A fourth data field 1628 enables one or more users to associate comments (e.g., text-based comments) with the transfer. For example, a user may select the fourth date field 1628 of one of the transfer event updates to open a text box or other editable data field. In other implementations, additional data fields also may be displayed.

Figure 17:
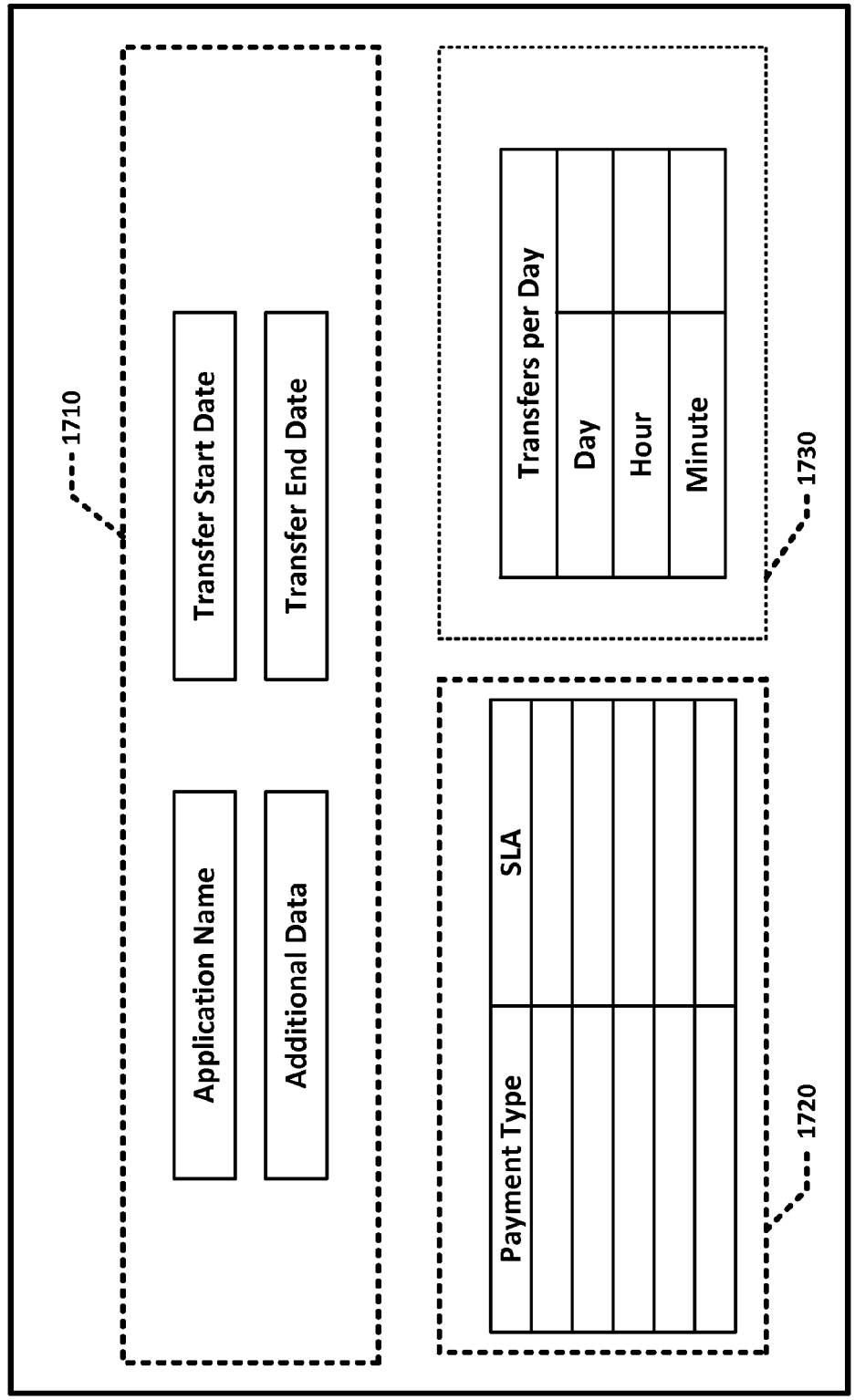

FIG. 17 shows an example customer profile template 1700 in which customer-specific data may be presented to a user. The customer profile template 1700 includes a file transfer section 1710, a payment section 1720, and a metrics section 1730. In the example shown, the file transfer section 1710 is disposed over the other two sections 1720, 1730. In other implementations, however, the sections 1710, 1720, 1730 may be displayed in any desired format.

The file transfer section 1710 provides a listing of criteria based on which the customer data has been pulled. In the example shown, the file transfer section 1710 displays a transfer start date (i.e., or timestamp), a transfer end date (i.e., or timestamp), and an application name. In certain implementations, the payment section 1720 may provide payment types associated with the customer profile and Service Level Agreement (SLA) date for each payment type. The SLA date refers to the time period within which the file being transferred should be processed by the receiving application. The metrics section 1730 displays file transfer averages (e.g., broken down by day, hour, and minutes). In certain implementations, the file transfer averages are taken daily.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A system network comprising:
   one or more computing devices with at least a processing unit and memory;
   a processing system implemented by the processing unit and memory of at least one of the computing devices, the processing system including a plurality of applications, each application being associated with at least one other of the applications in an application pair, each application pair being configured to transfer business events there between, each application pair having a corresponding set of rules for generating correlation information based on the business events being transferred, different application pairs being capable of having different sets of rules for generating correlation information based on the business events being transferred, each application being configured to generate and send event messages including the correlation information when a business event occurs, the correlation information being generated and sent based on the set of rules for each application pair; and
   a tracking system implemented by the processing unit and memory of one of the computing devices, the tracking system including an event collector configured to receive the messages from the applications, the tracking system also including an event aggregation module having a relations data store, the event aggregation module being configured to generate unique tracking identifiers for each business event, the relations data store containing a record of messages for a plurality of business events that are associated with each unique tracking number for each business event, the event aggregation module being configured to correlate related messages based at least in part on the correlation information contained in the messages, and to update the relations data store to associate the related messages pertaining to the business event with the respective unique tracking identifier, wherein the tracking system does not correlate related messages using the unique tracking identifiers.

2. The system network of claim 1, wherein related messages include messages sent by different applications in response to the same business event.

3. The system network of claim 1, wherein the event aggregation module also correlates the related messages based on source application information, destination application information, direction information, and status information.

4. The system network of claim 1, wherein each message includes at least current correlation information that is generated based on a current application pair between which a business event is being transferred.

5. The system network of claim 4, wherein some of the messages also include previous correlation information that is generated based on a previous application pair between which the respective business event was transferred.

6. The system network of claim 1, wherein the event aggregation module includes a hold data store in which the event aggregation module stores messages that the event aggregation module is unable to correlate.

7. A method of monitoring a processing system including a plurality of applications, the method comprising
   receiving at least one message at an event collector module, each message identifying correlation information pertaining to a business event, the correlation information having been generated by an application of the processing system based on rules associated with an upstream-downstream application pair, different application pairs being capable of having different sets of rules for generating correlation information based on the business event, the correlation information being an identifier generated based on the rules;
   determining whether the message is associated with a new business event or an existing business event;
   storing the message in a relations data store with a newly generated unique tracking identifier if the message is associated with a new business event;
   correlating the message to a previous message contained in the relations data store if the message is associated with an existing business event, wherein correlating the message includes matching at least the correlation information of the message to correlation information of the previous message;
   identifying a unique identifier associated with the previous message; and updating the relations data store to add the message in association with the identified unique identifier.

8. The method of claim 7, wherein each message received at the event collector module identifies a source application, a destination application; and wherein correlating the message to a previous message includes verifying a potential match using at least one of the source application and destination application identified by the message.

9. The method of claim 7, wherein each message received at the event collector module includes a generate flag; and wherein the message is determined to be associated with a new business event if the generate flag has a value of true and wherein the message is determined to be associated with an existing business event if the generate flag has a value of false.

10. The method of claim 7, further comprising:
adding the message to a reporting queue; and
presenting a report based on messages contained in the reporting queue.

11. The method of claim 10, wherein presenting the report based on messages contained in the reporting queue comprises generating an interactive web page displaying metadata pertaining to at least some of the messages contained in the reporting queue.

12. The method of claim 11, wherein the reporting queue includes a business activity monitoring (BAM) server queue.

13. The method of claim 10, wherein presenting a report based on messages contained in the reporting queue comprises sending a notification to a user in response to one of the messages contained in the reporting queue.

14. The method of claim 13, wherein sending a notification includes sending an email.

15. The method of claim 10, wherein presenting a report based on messages contained in the reporting queue comprises forwarding one of the messages to an application in the processing system.

* * * * *